(12) United States Patent
Wang et al.

(10) Patent No.: US 11,796,868 B2
(45) Date of Patent: Oct. 24, 2023

(54) DISPLAY PANEL AND DISPLAY DEVICE

(71) Applicant: Xiamen Tianma Micro-Electronics Co., Ltd., Xiamen (CN)

(72) Inventors: Hailiang Wang, Xiamen (CN); Yaying Li, Xiamen (CN); Wenhuan Zhang, Xiamen (CN); Yan Yang, Xiamen (CN); Ting Zhou, Xiamen (CN); Junyi Li, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 91 days.

(21) Appl. No.: 17/365,782

(22) Filed: Jul. 1, 2021

(65) Prior Publication Data

US 2021/0325739 A1 Oct. 21, 2021

(30) Foreign Application Priority Data

Mar. 22, 2021 (CN) .......................... 202110300664.X

(51) Int. Cl.
*G02F 1/1343* (2006.01)
*G02F 1/1335* (2006.01)
(Continued)

(52) U.S. Cl.
CPC ...... *G02F 1/134345* (2021.01); *G02F 1/1368* (2013.01); *G02F 1/13306* (2013.01);
(Continued)

(58) Field of Classification Search
CPC ............. G02F 1/13306; G02F 1/13338; G02F 1/1335; G02F 1/133512; G02F 1/133514;
(Continued)

(56) References Cited

U.S. PATENT DOCUMENTS 9,057,915 B2 * 6/2015 Lu ..................... G02F 1/13439
2011/0249229 A1 * 10/2011 Kubota ............ G02F 1/133707
349/141
(Continued)

FOREIGN PATENT DOCUMENTS

| CN | 202600306 U | | 12/2012 | |
|---|---|---|---|---|
| CN | 102879958 | * | 1/2013 | ........... G02F 1/1343 |
| CN | 102929046 A | | 2/2013 | |
| CN | 110471211 A | | 11/2019 | |
| CN | 110783483 A | | 2/2020 | |

OTHER PUBLICATIONS

State Intellectual Property Office of the People's Republic of China, Text of First Office Action dated Jun. 14, 2022, issued in Chinese Application No. 202110300664 X, filed Mar. 22, 2021, 15 pages.

*Primary Examiner* — Thoi V Duong
(74) *Attorney, Agent, or Firm* — CHRISTENSEN O'CONNOR JOHNSON KINDNESS PLLC

(57) ABSTRACT

A display panel has a display region including a first display region and a second display region. In an embodiment, the display panel includes sub-pixels located in the display region, an array substrate and the color filter substrate that are opposite to each other, and liquid crystal molecules located between the array substrate and the color filter substrate. In an embodiment, the sub-pixels include first sub-pixels located in the first display region and second sub-pixels located in the second display region. In an embodiment, in the second display region, some of the second sub-pixels are first-type sub-pixels. In an embodiment, the first-type sub-pixel includes a first electrode and a second electrode. In an embodiment, in a first or second direction, orthographic projections of the first electrode and the second electrode at least partially overlap, the first direction intersects the second direction intersect, and the first direction and the second direction are parallel to a plane of the display panel.

36 Claims, 27 Drawing Sheets

(51) Int. Cl.
*G02F 1/133* (2006.01)
*G02F 1/1362* (2006.01)
*G02F 1/1368* (2006.01)

(52) U.S. Cl.
CPC .. *G02F 1/133512* (2013.01); *G02F 1/133514* (2013.01); *G02F 1/134309* (2013.01); *G02F 1/134336* (2013.01); *G02F 1/136227* (2013.01); *G02F 2202/28* (2013.01)

(58) Field of Classification Search
CPC ............ G02F 1/1343; G02F 1/134309; G02F 1/134318; G02F 1/134336; G02F 1/134363; G02F 1/134345; G02F 1/136227; G02F 1/136286; G02F 1/1368; G02F 2202/28; G09G 3/3607; G09G 3/3696
See application file for complete search history.

(56) References Cited

U.S. PATENT DOCUMENTS

2014/0320795 A1\* 10/2014 Hiratsuka ......... G02F 1/133377
349/139
2015/0124207 A1\* 5/2015 Itou ................... G02F 1/133753
349/139
2021/0261863 A1\* 8/2021 Kim .................... G02F 1/13775

\* cited by examiner

DISPLAY PANEL AND DISPLAY DEVICE

CROSS-REFERENCE TO RELATED APPLICATIONS

The present application claims priority to Chinese Patent Application No. 202110300664.X, filed on, Mar. 22, 2021, the content of which is incorporated herein by reference in its entirety.

TECHNICAL FIELD

The present application relates to the field of display technology, and particularly, to a display panel and a display device.

BACKGROUND

For a display panel with a camera function, a high transmittance region is usually provided in the display region of the panel to increase the screen-to-body ratio of the panel, and a camera assembly is arranged in the high transmittance region. Taking a liquid crystal display panel as an example, when the panel captures images, the liquid crystal molecules in the high transmittance region rotate under electric field formed by the pixel electrode and the common electrode. Ambient light passes through the liquid crystal molecules and is incident to the camera assembly, to collect ambient light and then further realize imaging.

However, based on the structure of the conventional liquid crystal display panel, a relatively obvious diffraction phenomenon will occur after the ambient light enters, which has an undesirable effect on imaging quality.

SUMMARY

In view of this, a display panel and a display device are provided according to embodiments of the present disclosure, to reduce the influence of diffraction phenomenon on imaging quality.

In a first aspect, a display panel is provided according to an embodiment of the present disclosure. In an embodiment, the display panel includes a display region having a first display region and a second display region; an array substrate and a color filter substrate that are opposite to each other; and liquid crystal molecules located between the array substrate and the color filter substrate. In an embodiment, multiple sub-pixels are arranged in the display region. In an embodiment, the sub-pixels include first sub-pixels located in the first display region and second sub-pixels located in the second display region. In an embodiment, in the second display region, at least part of the second sub-pixels is a first-type sub-pixel, and the first-type sub-pixel includes a first electrode and a second electrode. In an embodiment, in a first direction or a second direction, an orthographic projection of the first electrode and an orthographic projection of the second electrode at least partially overlap, the first direction intersects the second direction, and the first direction and the second direction are parallel to a plane of the display panel.

In a second aspect, a display device is provided according to an embodiment of the present disclosure, which includes the above-mentioned display panel.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, and other drawings can also be acquired by those skilled in the art without paying creative efforts.

DESCRIPTION OF EMBODIMENTS

In order to understand the technical solutions of the present disclosure better, embodiments of the present disclosure will be described in detail with reference to the accompanying drawings.

It should be noted that the described embodiments are some embodiments of the present disclosure, but not all of the embodiments. Other embodiments obtained by those persons skilled in the art based on the embodiments of the present disclosure shall fall within the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless the context indicates its meaning clearly.

It should be understood that the term "and/or" as used herein is merely an association describing the associated object, indicating that there can be three relationships. For example, A and/or B can indicate three cases: A alone; A and B; B alone. In addition, a character "/" herein generally indicates that the contextual objects are in an "or" relationship.

Before describing the technical solutions provided by the embodiments of the present disclosure, the problems in the related art are described.

Figure 1:
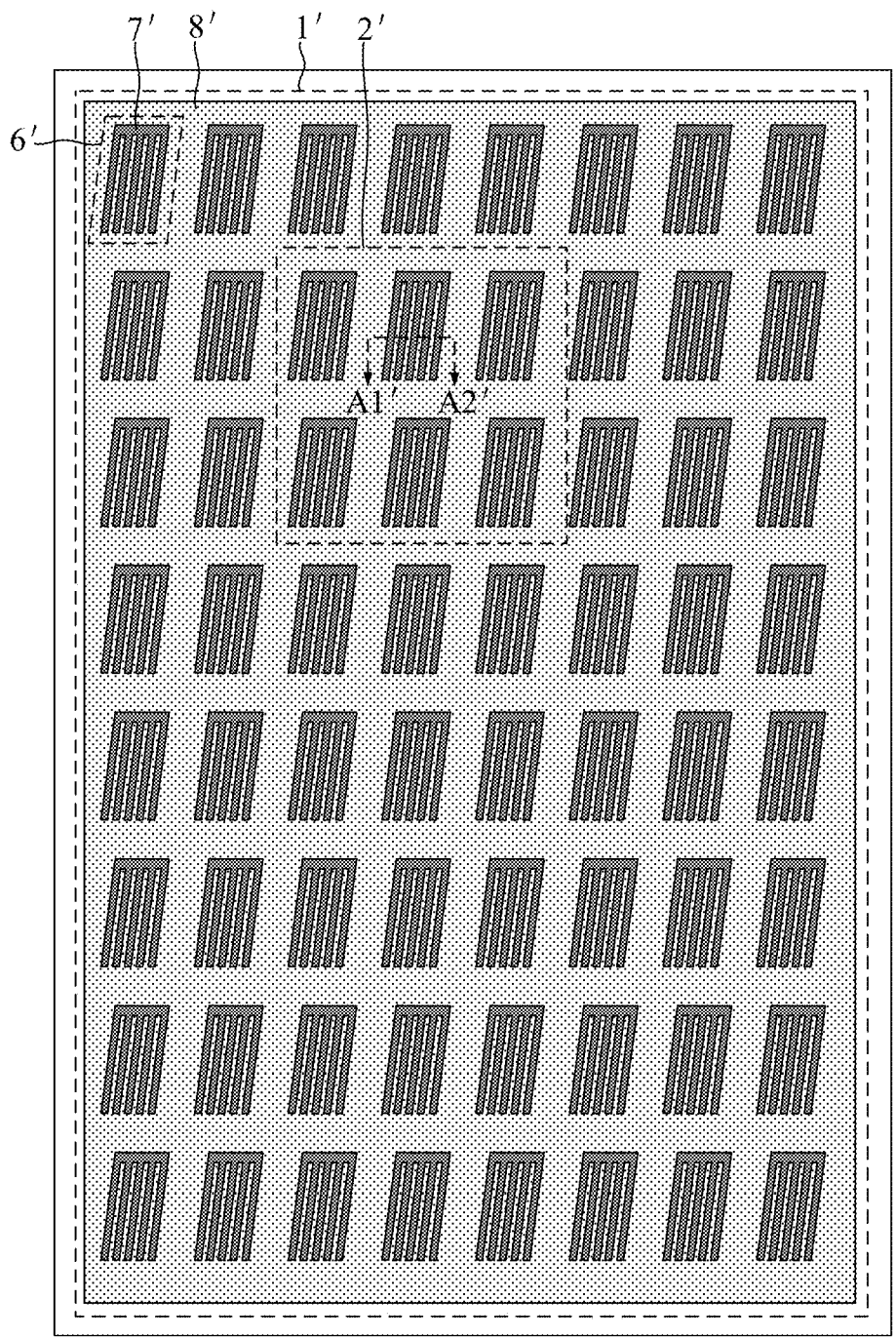
FIG. 1 is a top view of a conventional liquid crystal display panel.
Figure 2:
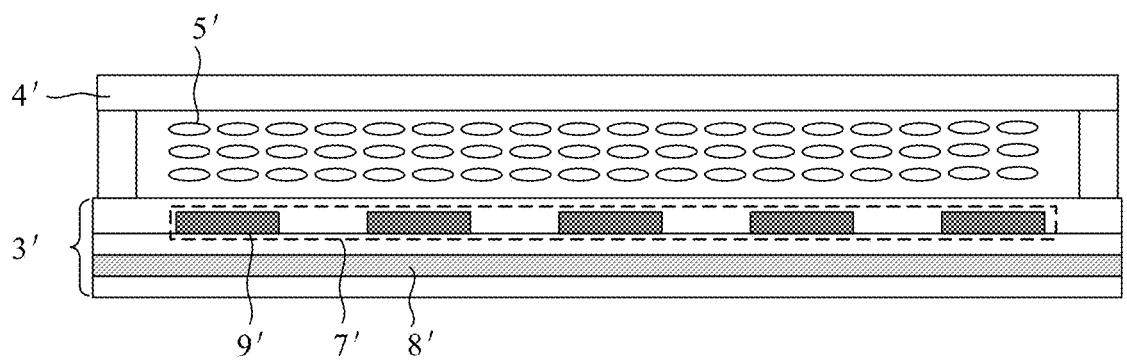
FIG. 2 is a cross-sectional view of FIG. 1 along A1'-A2'.

FIG. 1 is a top view of a conventional liquid crystal display panel, and FIG. 2 is a cross-sectional view of FIG. 1 along A1'-A2'. A display region 1' of the liquid crystal display panel includes a high transmittance region 2'. A camera assembly is provided in the high transmittance region 2'. The liquid crystal display panel includes an array substrate 3', and a color filter substrate 4' opposite to the array substrate 3'. Liquid crystal molecules 5' are arranged between the array substrate 3' and the color filter substrate 4'. Multiple pixel units 6' are provided in the array substrate 3', and each pixel unit 6' includes a pixel electrode 7' and a common electrode 8'.

When images are captured by the panel, the pixel electrode 7' in the high transmittance region 2' receives a driving voltage, the liquid crystal molecules 5' rotate under an electric field formed by the pixel electrode 7' and the common electrode 8', and ambient light passes through the liquid crystal molecule 5' and is incident to the camera assembly.

Figure 3:
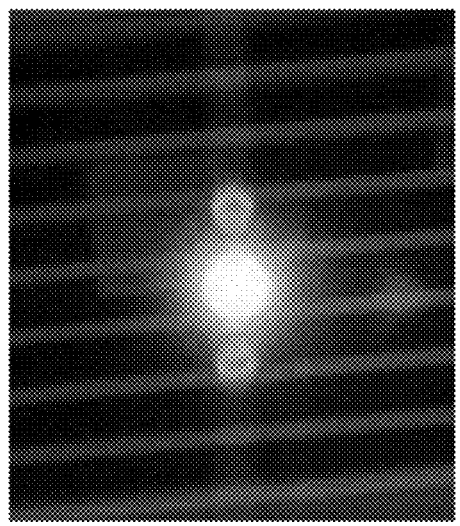
FIG. 3 is a schematic diagram of diffraction fringes generated when electrodes are powered off in the existing technology.

The inventor found that original opening regions of pixel units 6' in the high transmittance region 2' has been arranged periodically. Thus, even if the electrode is powered off, a diffraction phenomenon will still occur after the ambient light enters this periodic arrangement. Diffraction fringes are shown in FIG. 3. After the electrode is powered on, the liquid crystal molecules 5' will be arranged in a denser periodic rotation under the electric field formed by the electrodes. After the ambient light enters this denser periodic arrangement, the diffraction phenomenon is more obvious.

Figure 4:
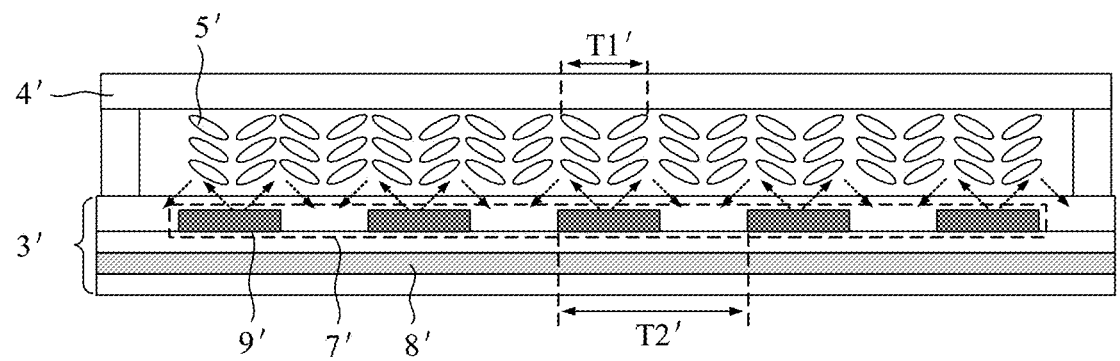
FIG. 4 is a schematic diagram of rotations of liquid crystal molecules in a high-transmittance region in the existing technology.
Figure 5:
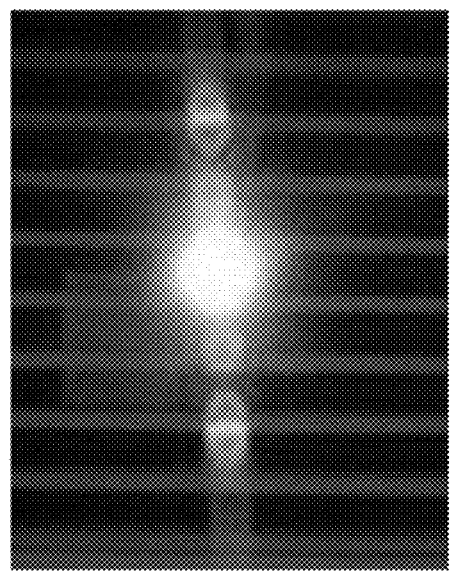
FIG. 5 is a schematic diagram of diffraction fringes generated when electrodes are powered on in the existing technology.

The fringe field switching (FFS) mode is taken as an example. In this mode, with reference to FIG. 1 and FIG. 2 again, the pixel electrode 7' and the common electrode 8' are stacked in a direction perpendicular to the plane of the display panel. The pixel electrode 7' has a comb-shaped structure and includes multiple electrode strips 9' arranged at intervals. After the pixel electrode 7' is powered on, each electrode strip 9' of the pixel electrode 7' will form, with the common electrodes 8' located at two sides of the electrode strip 9', electric fields. Directions of the electric fields are different. With reference to a schematic diagram of rotation of the liquid crystal molecules shown in FIG. 4, the liquid crystal molecules 5' rotate in different directions under the electric fields with different directions, and multiple rows of liquid crystal molecules 5' form a dense periodic rotation arrangement. Moreover, an arrangement period T1' of the liquid crystal molecules 5' is very small, which is only approximately half of the arrangement period T2' of the electrode strips 9'. After the ambient light enters the dense periodic arrangement of the liquid crystal molecules 5', the emitted light has a certain phase difference. Thus, periodic interference is more likely to occur in the subsequent transmission process, which aggravates the diffraction phenomenon and thus generates diffraction fringes as shown in FIG. 5. It can be seen by comparing FIG. 3 with FIG. 5 that the diffraction fringes produced by the ambient light are more obvious after the electrode is powered on, which will have a greater adverse effect on the imaging quality.

In order to solve the above problem, a display panel is provided according to an embodiment of the present disclosure, which is suitable or otherwise configured to adjust the electrode structure in the high transmittance region to change the arrangement of the liquid crystal molecules after the electrode is powered on, thereby significantly weakening the adverse effect of diffraction fringes on the imaging quality.

Figure 6:
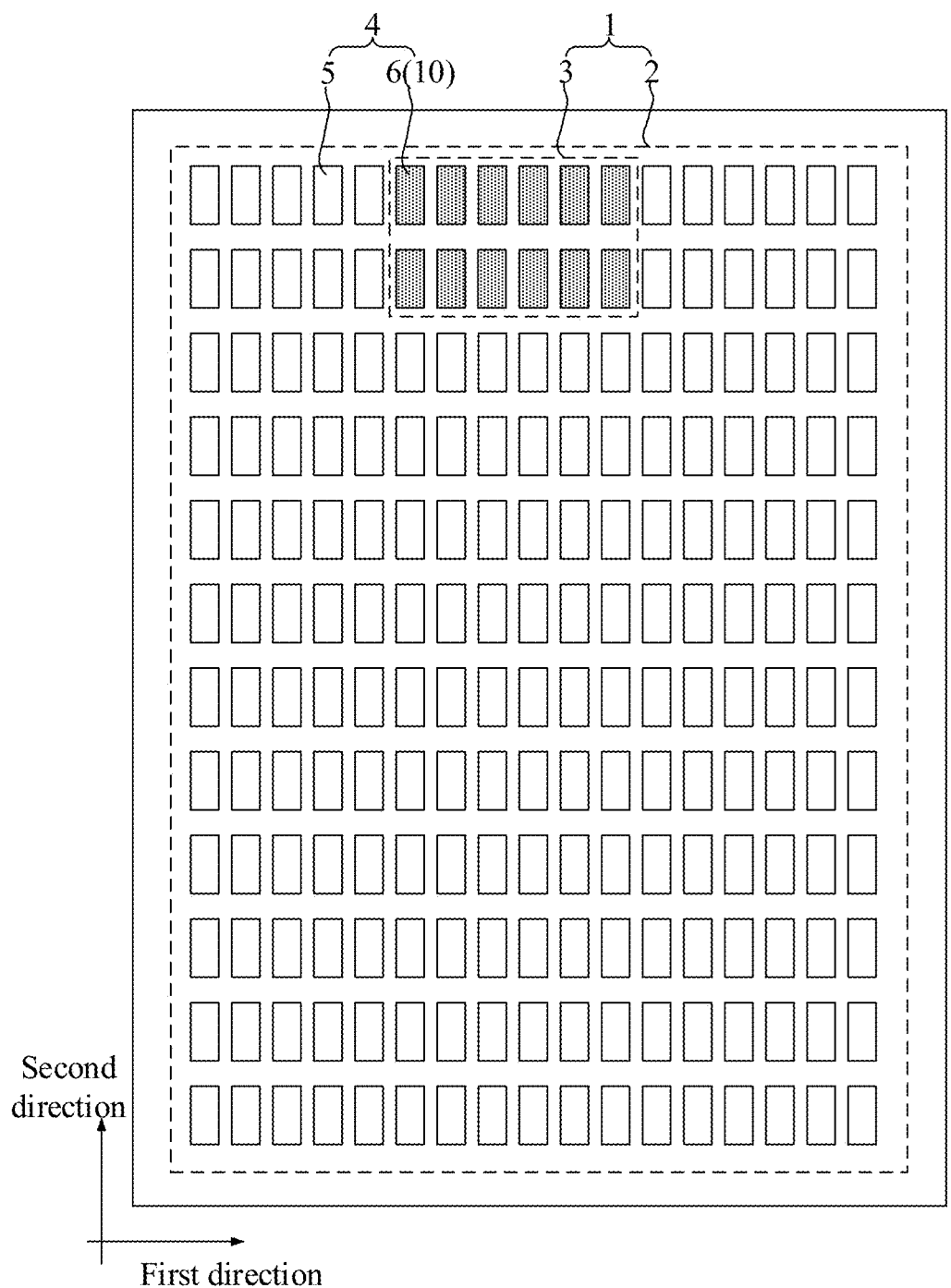
FIG. 6 is a top view of a display panel, according to an embodiment of the present disclosure.
Figure 7:
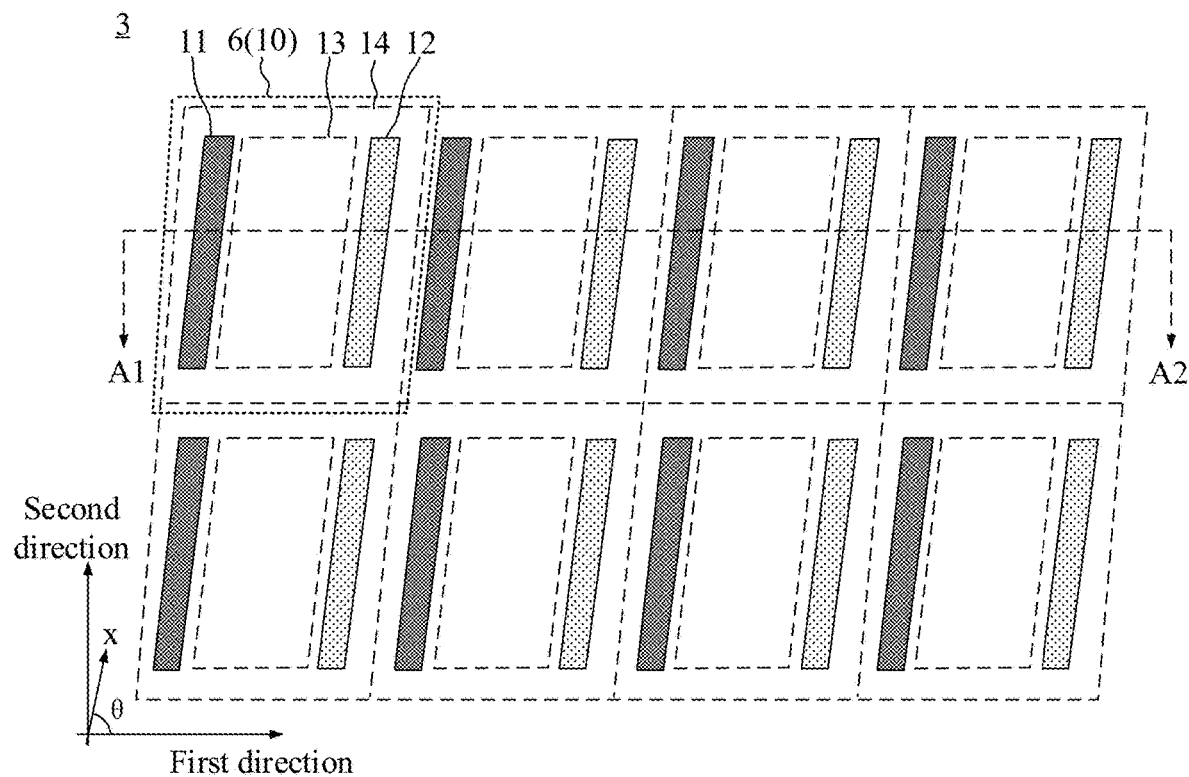
FIG. 7 is a schematic diagram of an arrangement of a first electrode and a second electrode, according to an embodiment of the present disclosure.
Figure 8:
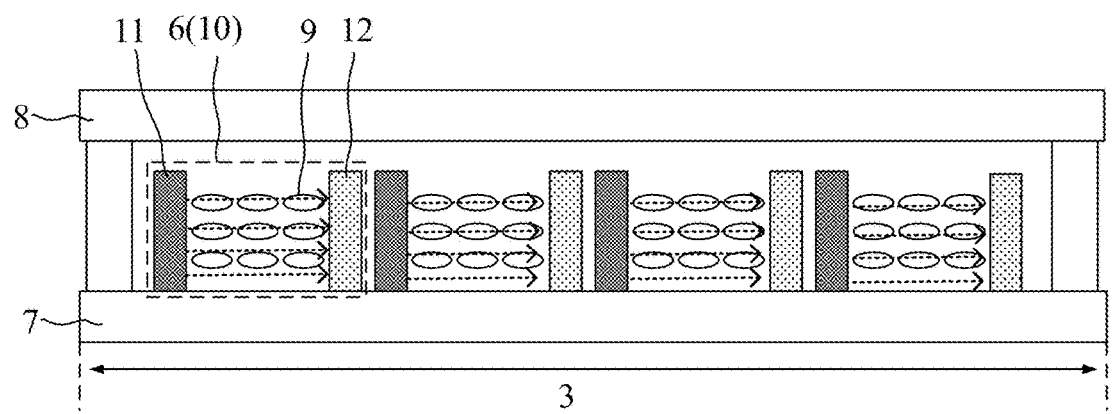
FIG. 8 is a cross-sectional view of FIG. 7 along A1-A2, according to an embodiment of the present disclosure.

FIG. 6 is a top view of a display panel according to an embodiment of the present disclosure. FIG. 7 is a schematic diagram of an arrangement of a first electrode and a second electrode according to an embodiment of the present disclosure. FIG. 8 is a cross-sectional view of FIG. 7 along A1-A2. The display panel includes a display region 1 having a first display region 2 and a second display region 3. Multiple sub-pixels 4 are located in the display region 1, and the sub-pixels 4 includes first sub-pixels 5 located in the first display region 2 and second sub-pixels 6 located in the second display region 3. The display panel further includes an array substrate 7, a color filter substrate 8 opposite to the array substrate 7, and liquid crystal molecules 9 located between the array substrate 7 and the color filter substrate 8.

In the second display region 3, at least part of second sub-pixels 6 are first-type sub-pixels 10. The first-type sub-pixel 10 includes a first electrode 11 and a second electrode 12. In a first direction or a second direction, an orthographic projection of the first electrode 11 and an orthographic projection of the second electrode 12 at least partially overlap. The first direction intersects the second direction, and the first direction and the second direction are parallel to a plane of the display panel. The embodiment of the present disclosure takes the first direction as a row direction and the second direction as a column direction as an example for illustration.

It should be noted that, in an embodiment of the present disclosure, the second display region 3 may be a high transmittance region where a camera assembly is located, and the first-type sub-pixels 10 are sub-pixels for implementing a camera function. When an image is captured by the display panel, the first electrode 11 in the first-type sub-pixel 10 receives a first driving voltage, the second electrode 12 receives a second driving voltage, and the liquid crystal molecules 9 rotate under an electric field formed by the first electrode 11 and the second electrode 12. The ambient light passes through the liquid crystal molecules 9 and enters the camera assembly to realize the collection of the ambient light.

In a display panel according to an embodiment of the present disclosure, the first electrode 11 and the second electrode 12 of the first-type sub-pixel 10 overlap in a direction parallel to the plane of the display panel. A transverse electric field is formed between the first electrode 11 and the second electrode 12, which has an electric field direction from the first electrode 11 to the second electrode 12 (the electric field direction is shown by the dotted arrow in FIG. 8), so that the liquid crystal molecules 9 located between the first electrode 11 and the second electrode 12 rotates towards the same direction. Compared with the conventional liquid crystal display panel, it is eliminated that the liquid crystal molecules 9 rotating with the electric field direction are arranged in a periodic rotation due to the periodically changing electric field directions in a single sub-pixel. The rotation directions of the liquid crystal molecules 9 are the same, and the ambient light has the same phase after passing through the liquid crystal molecules. Thus, the light waves will not form obvious diffraction fringes after being superimposed, thereby effectively reducing the influence of the diffraction fringes on the imaging quality.

Figure 9:
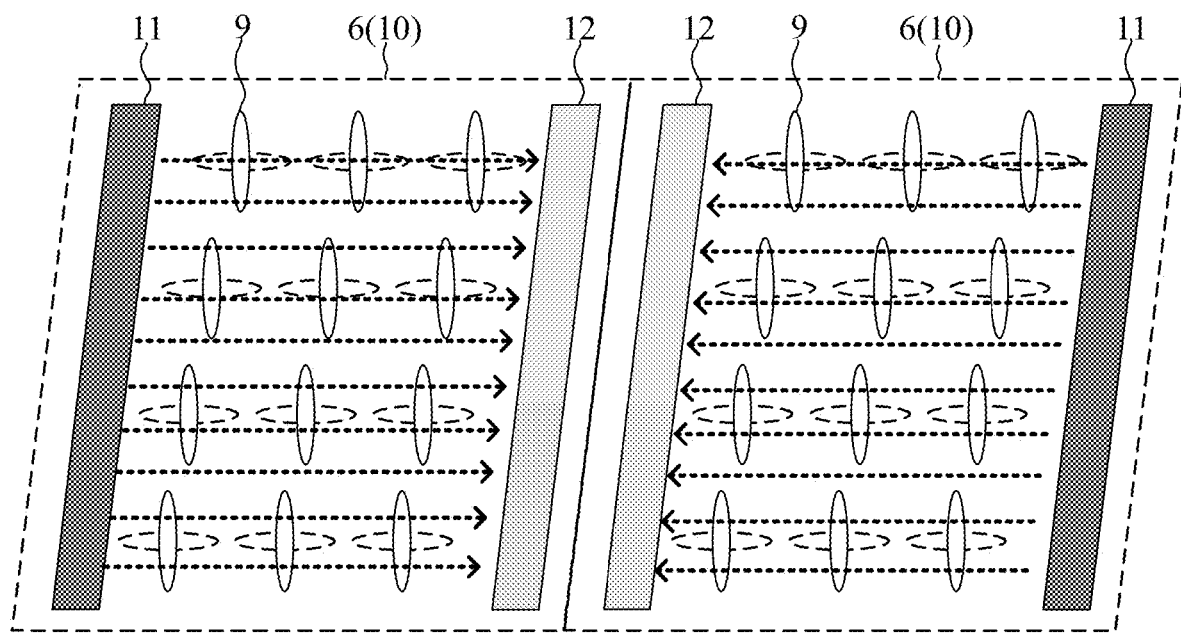
FIG. 9 is a schematic diagram of rotation of liquid crystal molecules, according to an embodiment of the present disclosure.

FIG. 9 is a schematic diagram of rotation of the liquid crystal molecules 9 according to an embodiment of the present disclosure. Even if the first electrode 11 and the second electrode 12 in different first-type sub-pixels 10 have opposite relative positions to make the directions of the transverse electric fields be opposite, the rotation states of the liquid crystal molecules 9 in the different first-type sub-pixels 10 are still the same, which greatly limits or eliminates the periodic rotation arrangement of the liquid crystal molecules 9, reducing the influence of diffraction fringes on imaging quality.

In addition, referring to FIG. 4 again, the fringe field switching (FFS) mode is taken as an example. In this driving mode, after the electrode is powered on, intensities of the transverse electric field components of the electric field at different positions are different, which leads to differences in the rotation angle of the liquid crystal molecules 5' at different positions, resulting in uneven light transmittance in the high transmittance region 2'.

In an embodiment of the present disclosure, the electric field formed by the voltage difference between the first electrode 11 and the second electrode 12 is a transverse electric field with uniform intensity. Thus, the rotation angles of the liquid crystal molecules 9 at different positions tend to be the same, which improves light transmission uniformity of the second display region 3. Moreover, under the transverse electric field, the angles of the rotated liquid crystal molecules 9 all tend to a preset rotation angle corresponding to the voltage difference, which can further improve the overall light transmittance of the second display region 3. Furthermore, when the image is displayed at the second display region 3, the brightness and brightness uniformity of the second display region 3 are improved, and thus the image display effect is improved. When the image is captured at the second display region 3, the quantity of the ambient light incident through the second display region 3 is increased, which optimizes the imaging effect.

Figure 10:
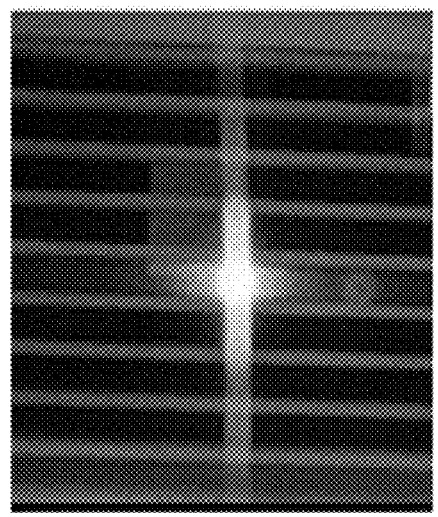
FIG. 10 is a schematic diagram of diffraction fringes generated when a conventional electrode structure is used and electrodes are powered off in a second display region.
Figure 11:
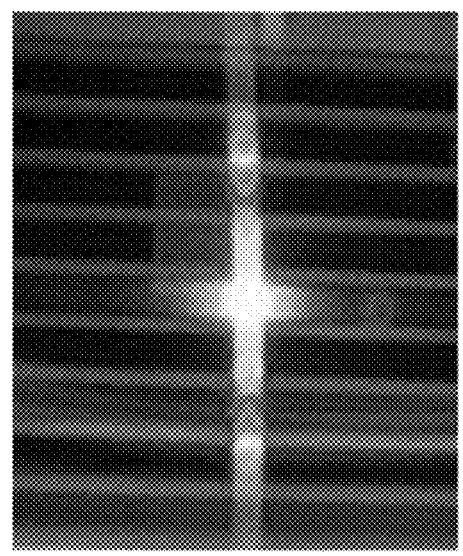
FIG. 11 is a schematic diagram of diffraction fringes generated when a conventional electrode structure is used and electrodes are powered on in a second display region.
Figure 12:
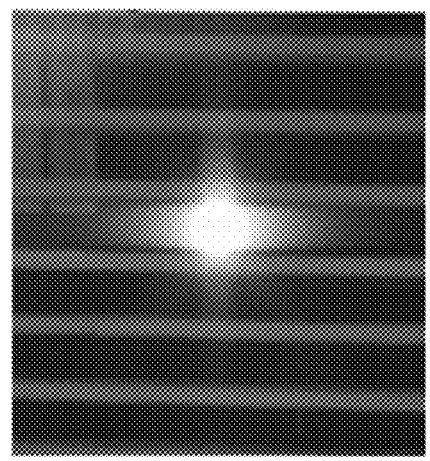
FIG. 12 is a schematic diagram of diffraction fringes generated when an electrode structure according to an embodiment of the present disclosure is adopted and electrodes are powered off in a second display region.
Figure 13:
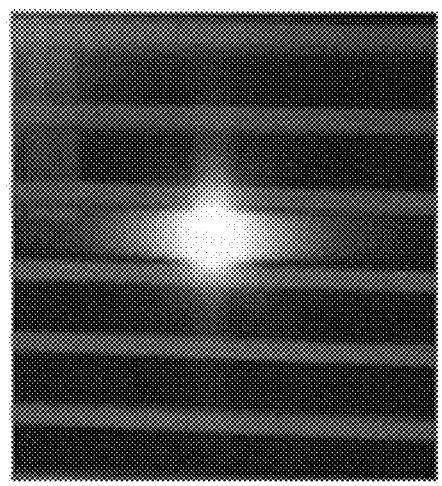
FIG. 13 is a schematic diagram of diffraction fringes generated when an electrode structure according to an embodiment of the present disclosure is adopted and electrodes are powered on in a second display region.

In addition, the diffraction phenomenon of the second display region 3 is tested. FIG. 10 is a schematic diagram of diffraction fringes generated when a second display region 3 adopts a conventional electrode structure and the electrodes are powered off. FIG. 11 is a schematic diagram of diffraction fringes generated when the second display region 3 adopts a conventional electrode structure and electrodes are powered on. FIG. 12 is a schematic diagram of diffraction fringes generated when a second display region 3 adopts an electrode structure according to an embodiment of the present disclosure and electrodes are powered off. FIG. 13 is a schematic diagram of diffraction fringes generated when a second display region 3 adopts an electrode structure according to an embodiment of the present disclosure and electrodes are powered on. By comparing FIG. 11 and FIG.

13, it can be seen that in a case where the second display region 3 adopts the electrode structure provided by the embodiment of the present disclosure, a distribution range of the diffraction fringes generated after the ambient light passes through the liquid crystal molecules 9 is smaller, and the diffraction phenomenon is weakened.

In an embodiment, referring to FIG. 8 again, the first electrode 11 and the second electrode 12 can be wall-shaped electrodes. In this case, the first electrode 11 and the second electrode 12 is higher in a direction perpendicular to the plane of the display panel. In this way, the distribution range of the transverse electric field is extended. It is ensured that the liquid crystal molecules 9 rotate under the transverse electric field, so that the second display region 3 maintains a higher transmittance.

The first electrode 11 and the second electrode 12 in an embodiment of the present disclosure can be made of a transparent metal oxide material, such as indium tin oxide. Alternatively, the first electrode 11 and the second electrode 12 can be made of a single layer of metal, such as aluminum. Alternatively, the first electrode 11 and the second electrode 12 can be made of multiple layers of metal, such as layers formed by superimposing a molybdenum layer, an aluminum layer and another molybdenum layer.

In an embodiment, referring to FIG. 7 again, the sub-pixel 4 includes an opening region 13 and a non-opening region 14 surrounding the opening region 13. The first electrode 11 and the second electrode 12 are located in the non-opening region 14 and respectively located at opposite sides of the opening region 13 in the first direction.

With such configuration, on one hand, the first electrode 11 and the second electrode 12 in all the first-type sub-pixels 10 are located at both sides of the opening region 13 in the same direction. Thus, the electrodes are arranged regularly, and the interference among the electric fields formed in different first-type sub-pixels 10 is small. On the other hand, a distance between the first electrode 11 and the second electrode 12 is larger, and the number of liquid crystal molecules 9 filled between the first electrode 11 and the second electrode 12 is larger. Thus, more liquid crystal molecules 9 rotate in the same direction. On the other hand, the first electrode 11 and the second electrode 12 are located in the non-opening region 14. Thus, no matter what material the electrode is made of, normal emission of light in the opening region 13 will not be affected. In other words, under the premise of ensuring normal emission of light in the opening region 13, the material of the electrode can be selected in a wide range.

Figure 14:
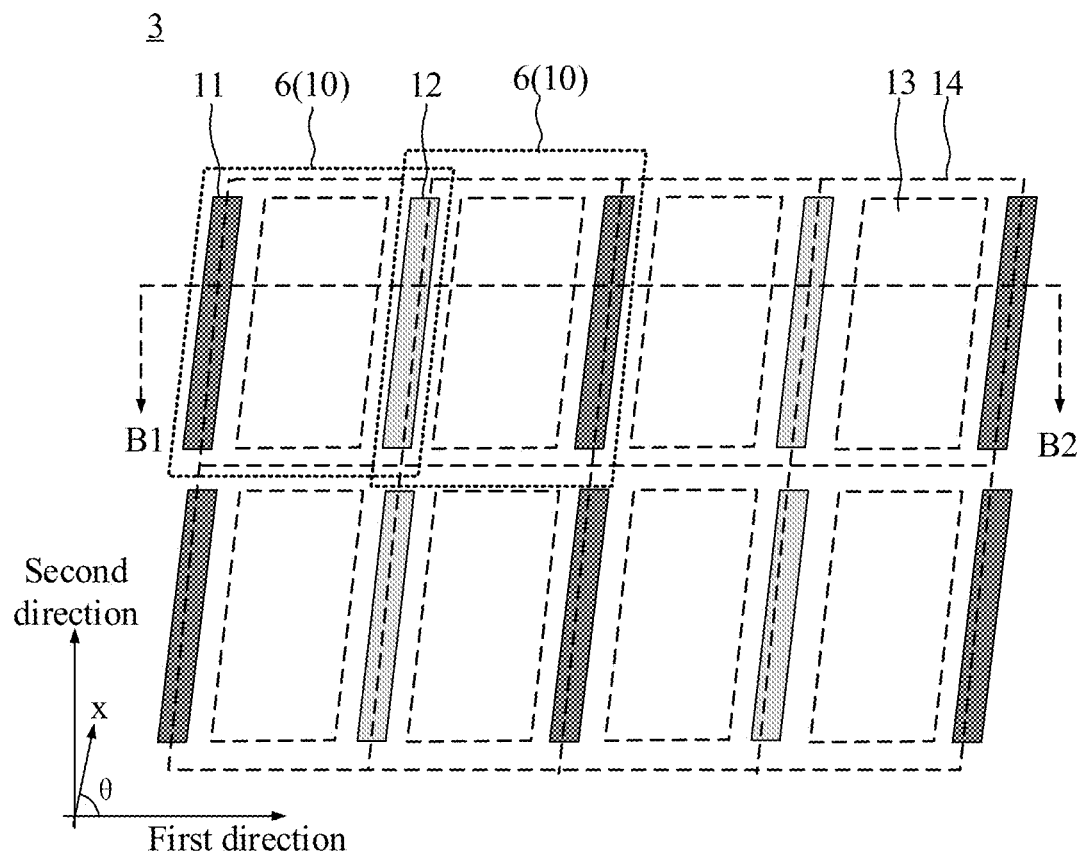
FIG. 14 is a schematic diagram of another arrangement of a first electrode and a second electrode, according to an embodiment of the present disclosure.
Figure 15:
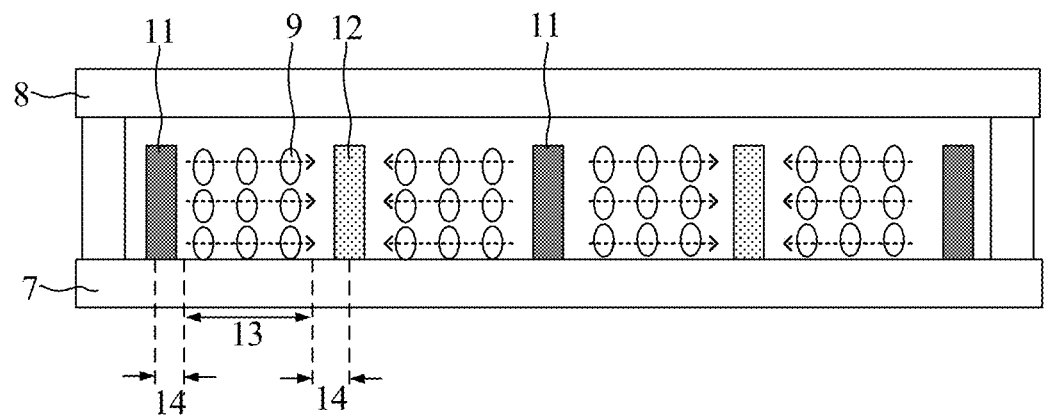
FIG. 15 is a cross-sectional view of FIG. 14 along B1-B2, according to an embodiment of the present disclosure.

FIG. 14 is a schematic diagram of another arrangement of a first electrode 11 and a second electrode 12 according to an embodiment of the present disclosure. FIG. 15 is a cross-sectional view of FIG. 14 along B1-B2. In an embodiment, in the first direction, the first electrodes 11 and the second electrodes 12 are alternately arranged, and two first-type sub-pixels 10 that are adjacent to each other in the first direction share one second electrode 12, or one first electrode 11. In this case, only one first electrode 11 or one second electrode 12 may be provided in the non-opening region 14 between two adjacent opening regions 13. Thus, the electrode occupies a smaller width in the non-opening region 14, and the non-opening region 14 does not need to be set too wide, which accordingly increases an aperture ratio of the sub-pixel.

Figure 16:
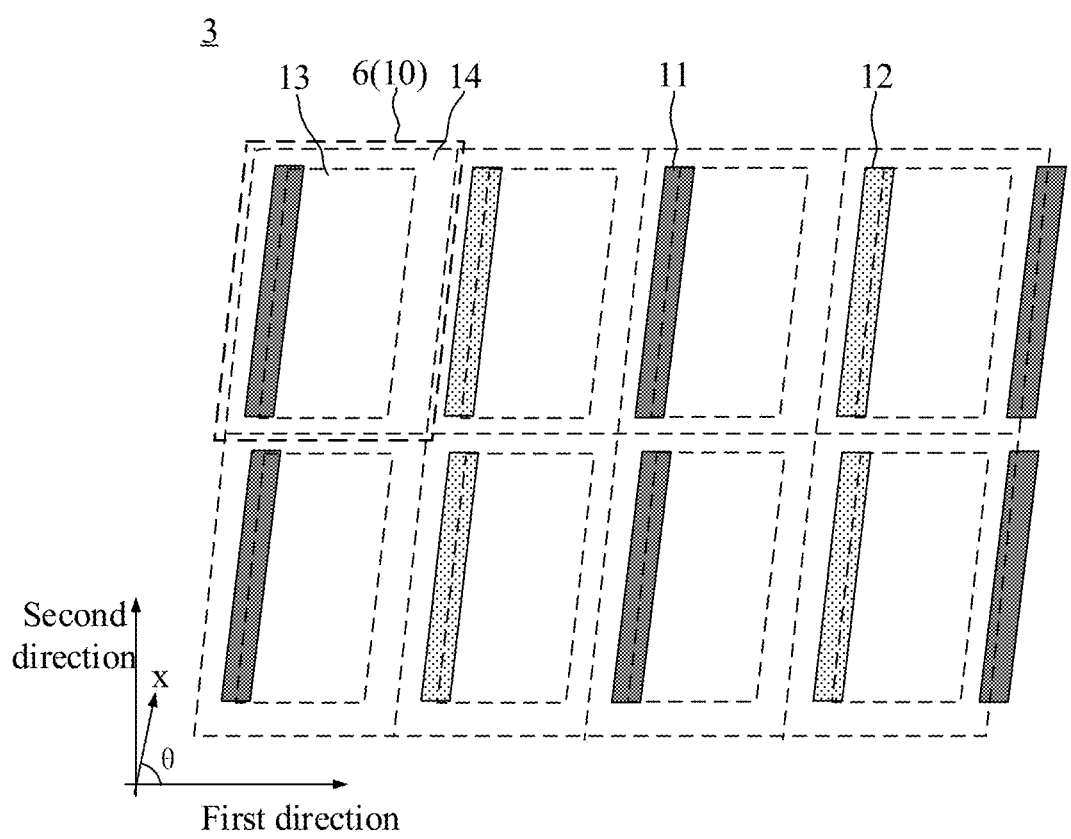
FIG. 16 is a schematic diagram of another arrangement of a first electrode and a second electrode, according to an embodiment of the present disclosure.
Figure 17:
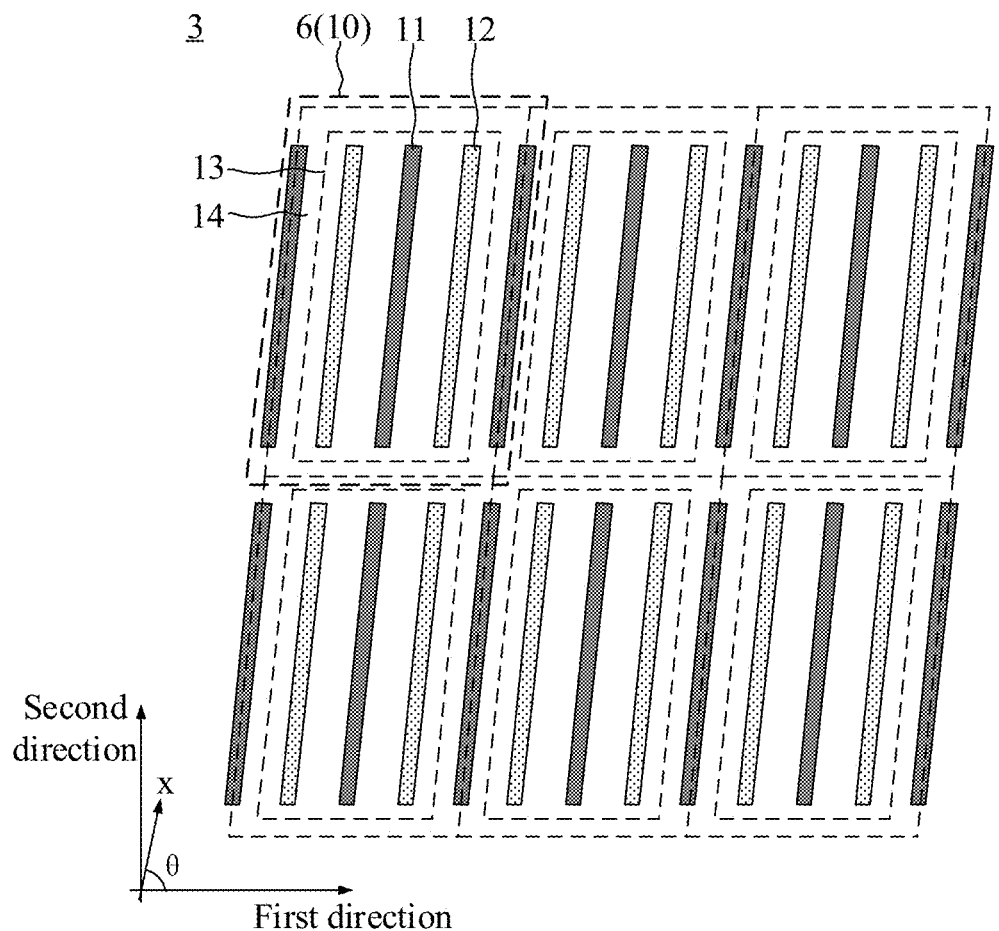
FIG. 17 is a schematic diagram of another arrangement of a first electrode and a second electrode, according to an embodiment of the present disclosure.

FIG. 16 is a schematic diagram of another arrangement of the first electrode 11 and the second electrode 12 according to an embodiment of the present disclosure. FIG. 17 is a schematic diagram of another arrangement of the first electrode 11 and the second electrode 12 according to an embodiment of the present disclosure. The sub-pixel 4 includes an opening region 13 and a non-opening region 14 surrounding the opening region 13. The first electrode 11 and the second electrode 12 of the same first-type sub-pixel 10 are arranged along the first direction. The orthographic projection of the first electrode 11 on the plane of the display panel and/or the orthographic projection of the second electrode 12 on the plane of the display panel overlaps with the opening region 13. The first electrode 11 and/or the second electrode 12 that overlaps with the opening region 13 is made of a transparent conductive material.

In this case, the first electrode 11 and/or the second electrode 12 can overlap the opening region 13. Even though a width of the non-opening region 14 in the first direction is smaller and a width of the opening region 13 in the first direction is larger, the distance between the first electrode 11 and the second electrode 12 can be reduced by arranging the first electrode 11 and/or the second electrode 12 in the opening region 13. In this way, an electric field with sufficient strength can be formed between the first electrode 11 and the second electrode 12 to drive the liquid crystal molecules 9 to rotate, so that the second display region 3 maintains a high transmittance. Moreover, the width of the first electrode 11 and/or the second electrode 12 does not need to be limited by the width of the non-opening region 14. Thus, this structure can be suitable for a display panel with a larger aperture ratio and the non-opening region 14 with a smaller width.

In addition, the first electrode 11 and/or the second electrode 12 that overlaps with the opening region 13 is set as a transparent electrode, which can maintain a high transmittance of the opening region 13 and prevent the normal light emission of the opening region 13 from being affected by the first electrode 11 and the second electrode 12.

In an embodiment, referring to FIG. 7, FIG. 14, and FIG. 16, an extension direction of the first electrode 11 and an extension direction of the second electrode 12 are parallel to each other; and an angle between the extension direction of the first electrode 11 and the first direction is θ, where 0°<θ<90°. A direction x illustrated in FIG. 7, FIG. 14, and FIG. 16 indicates the extension directions of the first electrode 11 and the second electrode 12.

It is understandable that, in order to control the liquid crystal molecules 9 to be in an orderly arrangement when powered off, one alignment layer is provided on a side of the array substrate 7 facing towards the color filter substrate 8, and another alignment layer is provided on a side of the color filter substrate 8 facing towards the array substrate 7. The two alignment layers are provided with grooves extending in the first direction or grooves extending in the second direction. The extension direction of the electrode is not parallel to an alignment direction, which can ensure that the liquid crystal molecules 9 normally rotate under the electric field formed by the electrodes.

In an embodiment of the present disclosure, in order to drive the liquid crystal molecules 9 effectively, the first electrode 11 and the second electrode 12 can be located on the array substrate 7 and/or the color filter substrate 8. That is, the first electrode 11 and the second electrode 12 are located in a liquid crystal cell between the array substrate 7 and the color filter substrate 8.

The following illustrates four configurations as examples.

In a first configuration, referring to FIG. 15 again, the first electrode 11 and the second electrode 12 are both located on a surface of the array substrate 7 facing towards the color filter substrate 8. In this configuration, after the array substrate 7 is manufactured, the first electrode 11 and the second electrode 12 are directly formed on the array substrate 7, and then the array substrate 7 and the color filter substrate 8 are arranged oppositely to form a cell.

It is understandable that various driving transistors and signal lines in the display panel are usually arranged in the array substrate 7. The first electrode 11 and the second electrode 12 are arranged on the array substrate 7. When the driving transistor or the driving signal line is used to transmit a signal to the electrode, the first electrode 11 and the second electrode 12 can be directly electrically connected to the corresponding driving transistor or connection line through via holes. The process difficulty is low and the connection reliability is strong.

Figure 18:
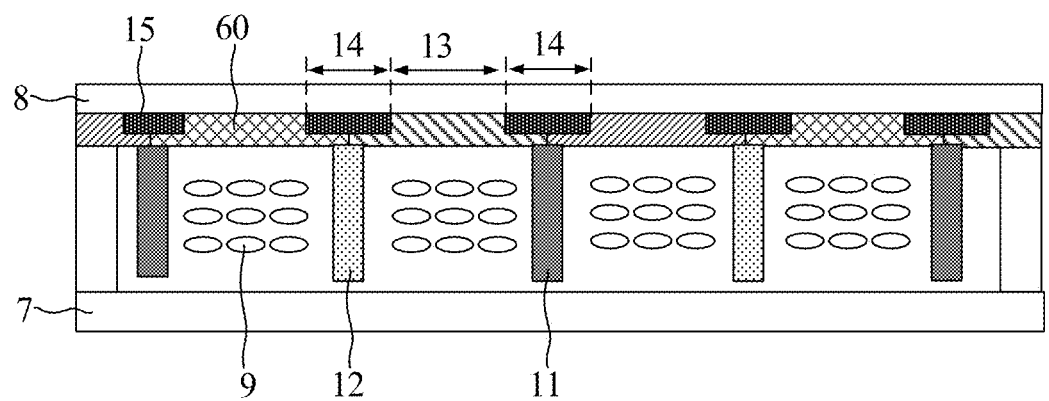
FIG. 18 is a schematic diagram of positions of a first electrode and a second electrode, according to an embodiment of the present disclosure.

A second configuration is shown in FIG. 18, which is another schematic diagram of positions of a first electrode 11 and a second electrode 12, according to an embodiment of the present disclosure. The sub-pixel 4 includes an opening region 13 and a non-opening region 14 surrounding the opening region 13. The color filter substrate 8 includes a light-shielding layer 15 and a color resist 60. An orthographic projection of the color resist 60 on the plane of the display panel covers the opening region 13 to realize color display. An orthographic projection of the light-shielding layer 15 on the plane of the display panel covers the non-opening region 14. The first electrode 11 and the second electrode 12 are both located on a surface of the color filter substrate 8 facing towards the array substrate 7. The orthographic projection of the first electrode 11 on the plane of the display panel and the orthographic projection of the second electrode 12 on the plane of the display panel overlap with the orthographic projection of the light-shielding layer 15 on the plane of the display panel. In this configuration, after the color filter substrate 8 is manufactured, the first electrode 11 and the second electrode 12 are directly formed on the color filter substrate 8, and then the color filter substrate 8 and the array substrate 7 are arranged oppositely to form a cell.

The first electrode 11 and the second electrode 12 are directly arranged on the color filter substrate 8. The relative positional relationship between the electrodes and the light shielding layer 15 will not be affected by factors such as the alignment deviation of the color filter substrate 8 and the array substrate 7. When the electrode is made of a metal material, it is avoided that the light shielding layer 15 cannot completely cover the electrode due to the alignment accuracy.

It should be noted that when the first electrode 11 and the second electrode 12 are located on the color filter substrate 8, even if the driving transistors or driving signal lines corresponding to the electrodes are provided on the array substrate 7, the signal can be transmitted to the electrode located on a side of the color filter substrate 8 by providing conductive particles in the spacers.

Figure 19:
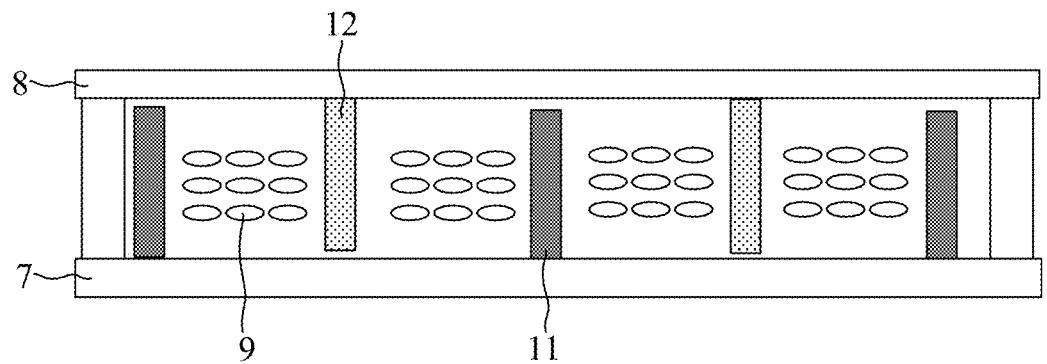
FIG. 19 is another schematic diagram of positions of a first electrode and a second electrode, according to an embodiment of the present disclosure.
Figure 20:
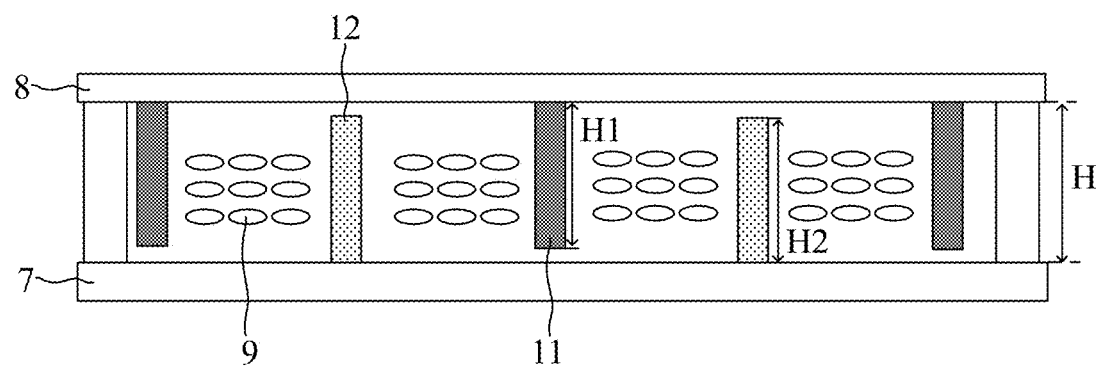
FIG. 20 is another schematic diagram of positions of a first electrode and a second electrode, according to an embodiment of the present disclosure.

A third configuration is illustrated in FIG. 19, which is another schematic diagram of positions of a first electrode 11 and a second electrode 12 according to an embodiment of the present disclosure. The first electrode 11 is located on the surface of the array substrate 7 facing towards the color filter substrate 8, and the second electrode 12 is located on the surface of the color filter substrate 8 facing towards the array substrate 7. In this configuration, after the color filter substrate 8 is manufactured, the second electrode 12 is formed on the color filter substrate 8. After the array substrate 7 is manufactured, the first electrode 11 is formed on the array substrate 7. Then, the color filter substrate 8 and the array substrate 7 are arranged oppositely to form a cell. In another embodiment, as shown in FIG. 20, FIG. 20 is another schematic diagram of positions of a first electrode 11 and a second electrode 12 according to an embodiment of the present disclosure. The first electrode 11 is located on the surface of the color filter substrate 8 facing towards the array substrate 7, and the second electrode 12 is located on the surface of the array substrate 7 facing towards the color filter substrate 8. In this configuration, after the color filter substrate 8 is manufactured, the first electrode 11 is formed on the color filter substrate 8. After the array substrate 7 is manufactured, the second electrode 12 is formed on the array substrate 7. Then, the color filter substrate 8 and the array substrate 7 are arranged oppositely to form a cell.

The first electrode 11 and the second electrode 12 are respectively arranged on different substrates, which not only improves the flexibility of the arrangement position of the electrodes, but also is more suitable for the case where the first electrode 11 and the second electrode 12 are made of different materials.

Figure 21:
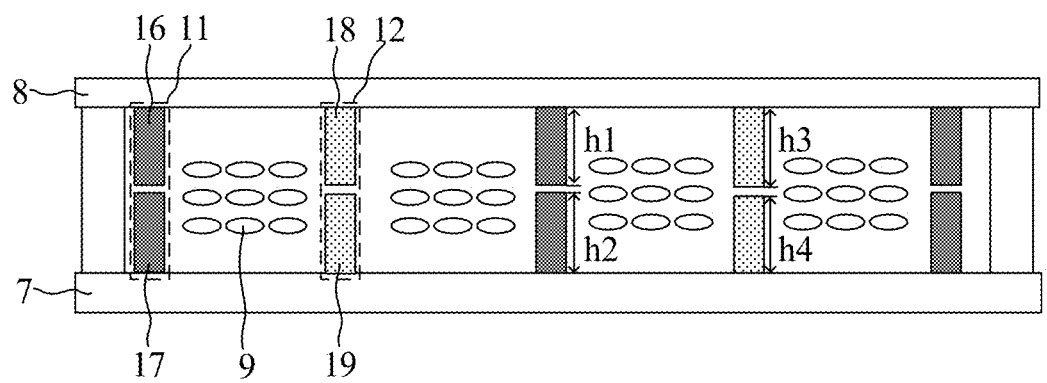
FIG. 21 is another schematic diagram of positions of a first electrode and a second electrode, according to an embodiment of the present disclosure.

A fourth configuration is shown in FIG. 21, which is another schematic diagram of positions of the first electrode 11 and the second electrode 12 according to an embodiment of the present disclosure. The first electrode 11 includes a first sub-electrode 16 and a second sub-electrode 17. The first sub-electrode 16 is located on the surface of the color filter substrate 8 facing towards the array substrate 7, and the second sub-electrode 17 is located on the surface of the array substrate 7 facing towards the color filter substrate 8. An orthographic projection of the first sub-electrode 16 on the plane of the display panel overlaps with an orthographic projection of the second sub-electrode 17 on the plane of the display panel. The second electrode 12 includes a third sub-electrode 18 and a fourth sub-electrode 19. The third sub-electrode 18 is located on the surface of the color film substrate 8 facing towards the array substrate 7, and the fourth sub-electrode 19 is located on the surface of the array substrate 7 facing towards the color filter substrate 8. An orthographic projection of the third sub-electrode 18 on the plane of the display panel overlaps with an orthographic projection of the fourth sub-electrode 19 on the plane of the display panel.

When both of the first electrode 11 and the second electrode 12 are respectively formed by two independent sub-electrodes, a height of a single sub-electrode in the direction perpendicular to the plane of the display panel is relatively small. Thus, this configuration has a low demand for electrode manufacturing process capability and is easier to implement in terms of process. Moreover, due to a single sub-electrode having a small height, when the panel is subjected to an external force, the sub-electrode is not easy to shake under the external force, thereby reducing the risk of the electrode being separated from the substrate.

In an embodiment, referring to FIG. 21 again, a height h1 of the first sub-electrode 16 in the direction perpendicular to the display panel is equal to a height h2 of the second sub-electrode 17 in the direction perpendicular to the display panel. A height h3 of the third sub-electrode 18 in the direction perpendicular to the display panel is equal to a height h4 of the fourth sub-electrode 19 in the direction perpendicular to the display panel. Taking the first electrode 11 as an example, under the condition that the height of the first electrode 11 is constant, the two sub-electrodes of the first electrode 11 have the same height to avoid that one sub-electrode is too high and sub-electrode is too low, so as to avoid a case that the process is difficult to realize due to the excessively high sub-electrode.

In an embodiment, the height h1 of the first sub-electrode 16 in the direction perpendicular to the display panel is equal to the height h3 of the third sub-electrode 18 in the direction perpendicular to the display panel. That is, a sub-electrode of the first electrode 11 and a sub-electrode of the second electrode 12 has the same height. In this case, if the first electrode 11 and the second electrode 12 are formed of the same material, the first sub-electrode 16 and the third sub-electrode 18 can be formed at the same time by the same patterning process after the color filter substrate 8 is fabricated, and the second sub-electrode 17 and the fourth sub-electrode 19 can also be formed by a same patterning process at the same time after the array substrate 7 is fabricated. Thus, the process flow is simplified, and the manufacturing cost is reduced.

In other embodiments of the present disclosure, the first sub-electrode 16, the second sub-electrode 17, the third sub-electrode 18 and the fourth sub-electrode 19 can also have different heights. The height of the sub-electrodes can be set according to actual demands.

In an embodiment, referring to FIG. 20 again, a height of the first electrode 11 in the direction perpendicular to the display panel is H1, a height of the second electrode 12 in the direction perpendicular to the display panel is H2. The first electrode 11 and the second electrode 12 are not too low in order to ensure an electric field with efficient large intensity formed between 11 and the second electrode 12 to fully drive the liquid crystal molecules 9 to rotate and to ensure the second display region 3 with a higher transmittance. Therefore, H1 and H2 may satisfy: $0.3 \ \mu m \leq H1 \leq H$, and $0.3 \ \mu m \leq H2 \leq H$, where H denotes a distance between the array substrate 7 and the color filter substrate 8.

Taking the electrode structure shown in FIG. 21 as an example, the transmittance of light at different positions of a single first sub-pixel 5 under different electrode heights is tested.

Figure 22:
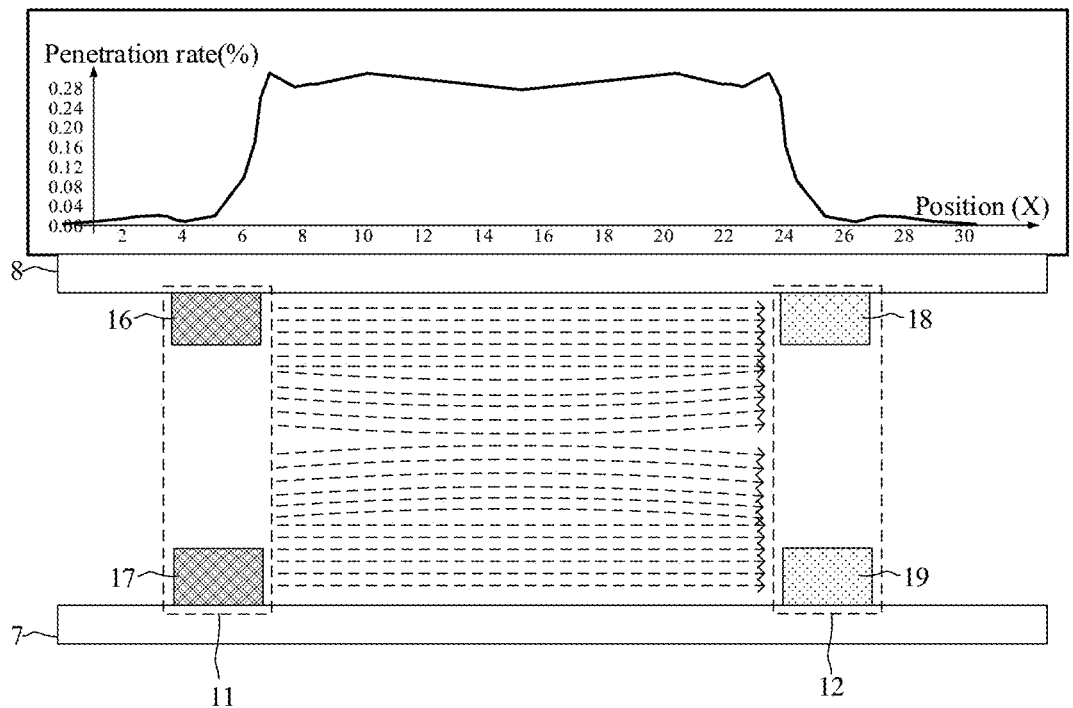
FIG. 22 is a schematic diagram of light transmittance at different positions of a single first-type sub-pixel, according to an embodiment of the present disclosure.
Figure 23:
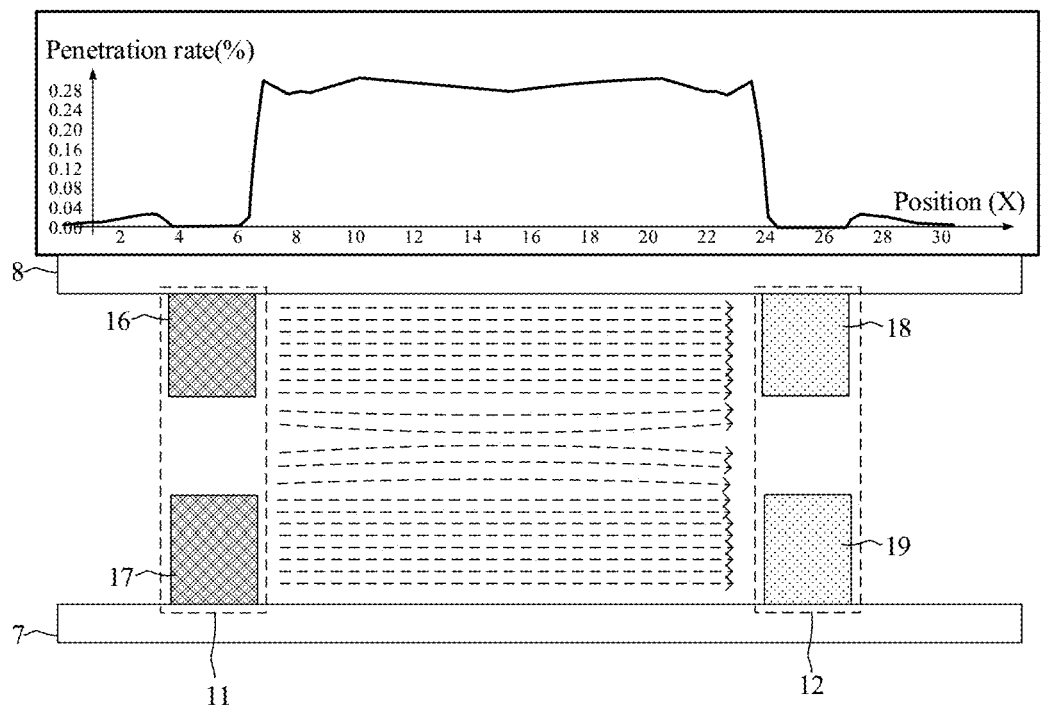
FIG. 23 is another schematic diagram of light transmittance at different positions of a single first-type sub-pixel, according to an embodiment of the present disclosure.
Figure 24:
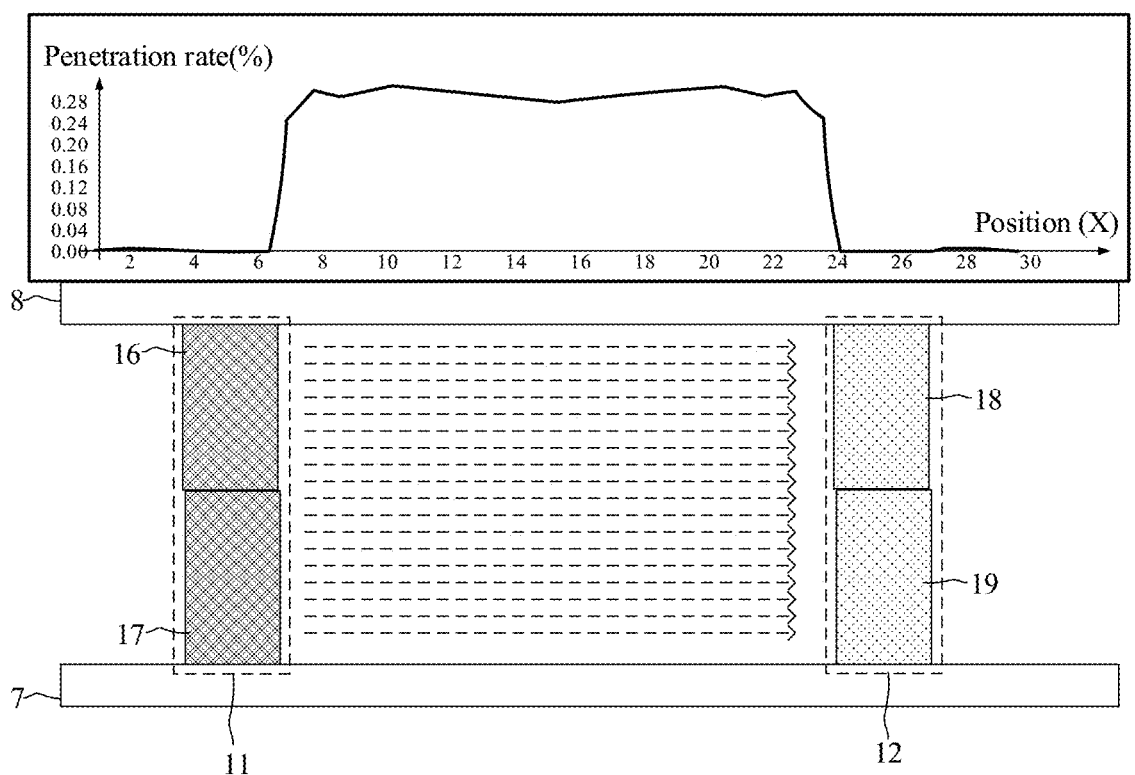
FIG. 24 is another schematic diagram of light transmittance at different positions of a single first-type sub-pixel, according to an embodiment of the present disclosure.

In a panel where the distance H between the array substrate 7 and the color filter substrate 8 is 3 μm, when the heights of the first sub-electrode 16, the second sub-electrode 17, the third sub-electrode 18 and the fourth sub-electrode 19 are all 0.5 μm, the transmittance at different positions of the single first-type sub-pixel 10 is shown in FIG. 22; when the first sub-electrode 16, the second sub-electrode 17, the third sub-electrode 18 and the fourth sub-electrode 19 have a height of 1 μm in the direction perpendicular to the panel, the transmittance at different positions of the single first-type sub-pixel 10 is shown in FIG. 23; and when the first sub-electrode 16, the second sub-electrode 17, the third sub-electrode 18, and the fourth sub-electrode 19 has a height of 1.5 μm in the direction perpendicular to the display panel, the transmittance at different positions of a single first-type sub-pixel 10 is shown in FIG. 24.

In combination with FIG. 22 to FIG. 24, it can be seen that the greater the heights of the first electrode 11 and the second electrode 12, the more positions will have the transverse electric field. Thus, the rotation states of the liquid crystal molecules 9 at more positions will be consistent and the transmittance at different positions is closer. In particular, referring to FIG. 24 again, when the heights of the first electrode 11 and the second electrode 12 are equal to the distance between the array substrate 7 and the color filter substrate 8, the transmittance difference at positions between the first electrode 11 and the second electrode 12 is small, so that the quantity of ambient light incident at each position tends to be the same.

Therefore, H1=H and H2=H, which can improve the uniformity of the quantity of light incident in different regions to optimize the imaging quality. In addition, the top surfaces and the bottom surfaces of the first electrode 11 and the second electrode 12 are in contact with the surfaces of the color filter substrate 8 and the array substrate 7 respectively. Thus, the first electrode 11 and the second electrode 12 can also serve as spacers, helping to improve the uniformity of the cell gap of the panel.

In addition, the brightness at different positions of a single first-type sub-pixel 10 is tested under the conditions of different electrode heights and different voltage differences $\Delta V$ between the first electrode 11 and the second electrode 12.

Figure 25:
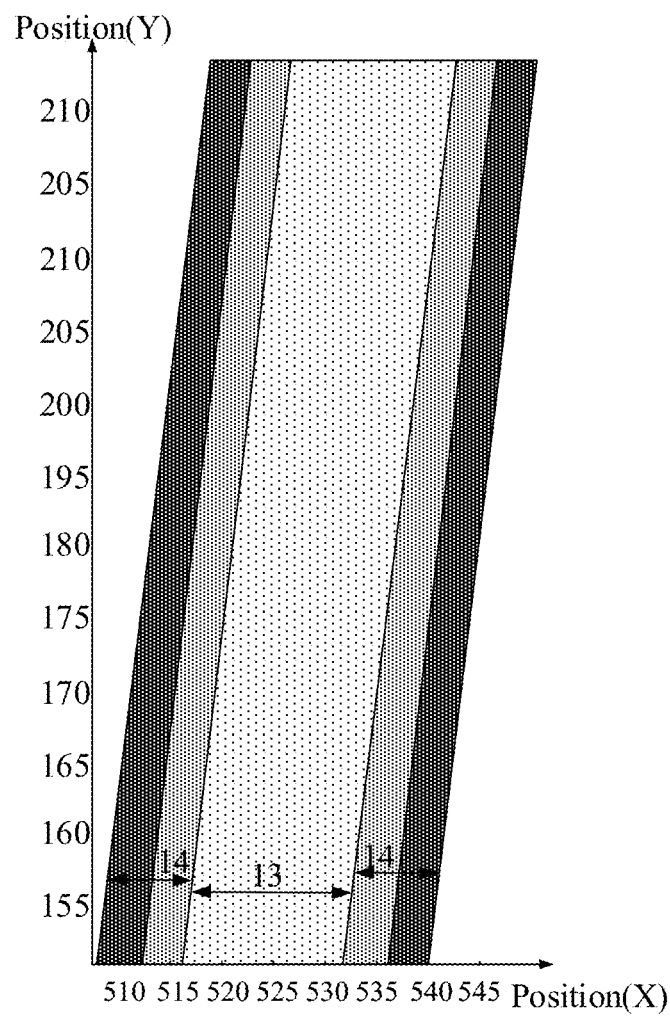
FIG. 25 is a schematic diagram of brightness distribution at different positions of a single first-type sub-pixel, according to an embodiment of the present disclosure.

Six brightness tests are performed under six groups of parameters conditions, i.e., H1=H2=0.5 μm and $\Delta V$=14V, H1=H2=1 μm and $\Delta V$=14V, H1=H2=1.5 μm and $\Delta V$=14V, H1=H2=2 μm and $\Delta V$=12V, H1=H2=2.5 μm and $\Delta V$=12V, and H1=H2=3 μm and $\Delta V$=12V. For these six brightness tests, the brightness distributions at different positions of the single first-type sub-pixel 10 are all presented in the trend of change shown in FIG. 25. In FIG. 25, the brightness differences are represented by difference filling shades. The region with the darker filling shade indicates the corresponding position of the single first-type sub-pixel having the lower brightness, and the region with the lighter filling color indicates the corresponding position of the single first-type sub-pixel having the higher brightness. The horizontal and vertical coordinates in FIG. 25 respectively indicate position points in the first direction and the second direction. The horizontal coordinates ranging from 507 to 515 and from 532 to 540 correspond to the non-opening region 14, and the horizontal coordinates ranging from 515 to 532 correspond to the opening region 13. It can be seen from FIG. 25 that the brightness in the opening region 13 is relatively high, which indicates that with the configuration of the above-mentioned electrodes, the rotation states of the liquid crystal molecules 9 in the opening region 13 is normal and will not affect the normal light emission of the first-type sub-pixels 10.

Figure 26:
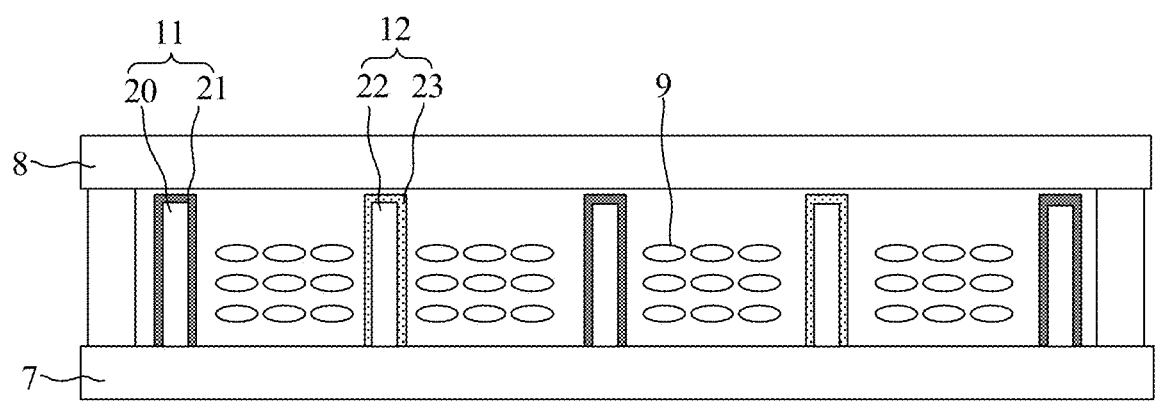
FIG. 26 is a schematic diagram of a first electrode and a second electrode, according to an embodiment of the present disclosure.

In an embodiment, as shown in FIG. 26, FIG. 26 is a schematic diagram of a first electrode 11 and a second electrode 12 according to an embodiment of the present disclosure. The first electrode 11 includes a first protrusion part 20 and a first conductive layer 21 covering the first protrusion part 20. The second electrode 12 includes a second protrusion part 22 and a second conductive layer 23 covering the second protrusion part 22.

Under the limitation of a current electrode manufacturing process capability, if the electrode is totally made of a conductive material, the electrode cannot be made too high. By covering the conductive layer on the surface of the protrusion part to form the electrode, the height of the electrode is no longer limited by the electrode manufacturing process capability. Thus, the height design of the electrode is more flexible, which is helpful for the application in the display panel with a high cell gap.

In an embodiment, in order to improve the stability and reliability of signal transmission on the first conductive layer 21 and the second conductive layer 23, the first protrusion part 20 and the second protrusion part 22 are made of conductive materials.

Alternatively, the first protrusion part 20 and the second protrusion part 22 can also be made of non-conductive materials. For example, the first protrusion part 20 and the second protrusion part 22 can be made of organic materials such as optical glue, or can be made of inorganic materials such as silicon nitride.

Figure 27:
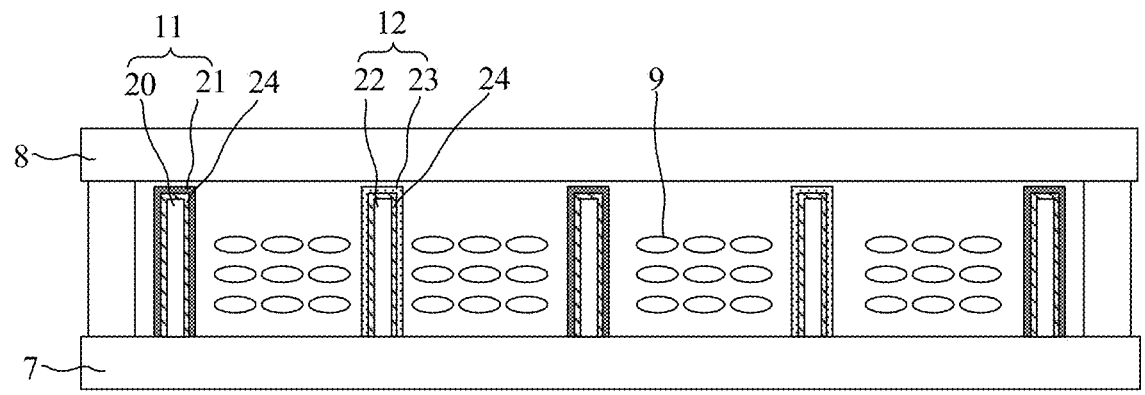
FIG. 27 is a schematic diagram of an auxiliary adhesion layer, according to an embodiment of the present disclosure.

FIG. 27 is a schematic diagram of an auxiliary adhesion layer 24 according to an embodiment of the present disclosure. As shown in FIG. 27, an auxiliary adhesion layer 24 is provided between the first protrusion part 20 and the first conductive layer 21 and between the second protrusion part 22 and the second conductive layer 23, to overcome the problem of poor adhesion caused by the formation of the protrusion part and the conductive layer of different materials. In this way, the adhesion between the protrusion part and the conductive layer is improved, and an exfoliation risk of the conductive layer is reduced. In an embodiment, when the first protrusion part 20 and the second protrusion part 22 are made of an organic material and the first conductive layer 21 and the second conductive layer 23 are made of a metal oxide material, the auxiliary adhesion layer 24 can be made of inorganic materials, such as silicon nitride.

Figure 28:
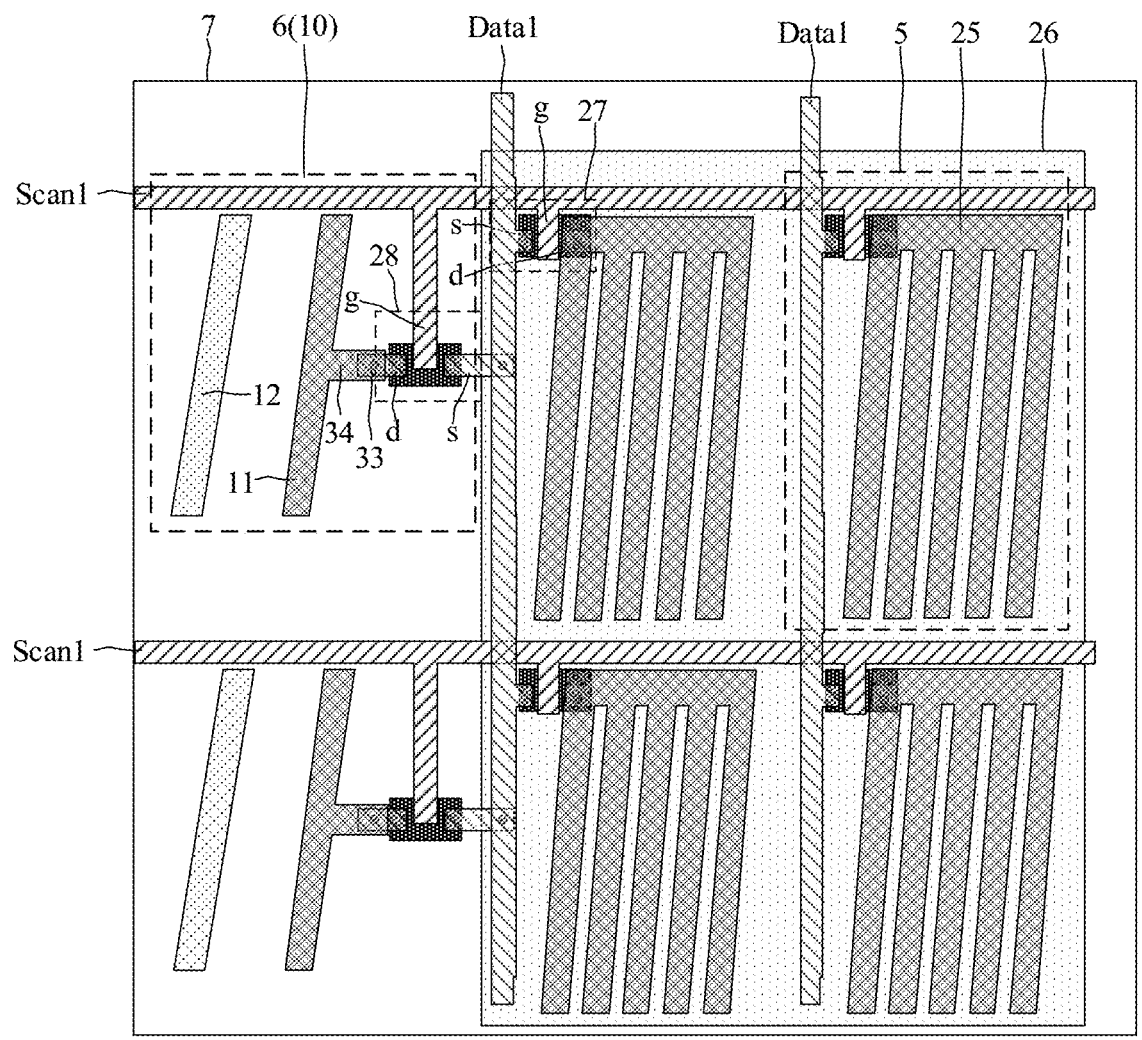
FIG. 28 is a schematic diagram of a connection of a first electrode, according to an embodiment of the present disclosure.

FIG. 28 is a schematic diagram of a connection of a first electrode 11 according to an embodiment of the present disclosure. As shown in FIG. 28, the first sub-pixel 5 includes a first pixel electrode 25 and a first common electrode 26 that are located on the array substrate 7. An orthographic projection of the first pixel electrode 25 on the plane of the display panel overlaps with an orthographic projection of the first common electrode 26 on the plane of the display panel. The first sub-pixel 5 further includes a first driving transistor 27. The gate g of the first driving transistor 27 is electrically connected to a first gate line Scan1, a first-electrode s of the first driving transistor 27 is electrically connected to a first data line Data1, and a second-electrode d of the first driving transistor 27 is electrically connected to the first pixel electrode 25.

When the image is displayed on the display panel, the first common electrode 26 receives a common voltage, the first driving transistor 27 is turned on under an effective level provided by the first gate line Scan1. A data voltage transmitted on the first data line Data1 is transmitted to the first pixel electrode 25 through the turned-on first driving transistor 27. The liquid crystal molecules 9 rotate under the electric field formed by the first pixel electrode 25 and the first common electrode 26 to realize normal image display.

Based on the structure of the first sub-pixel 5, the connection of the first electrode 11 will be described below by taking four configurations as examples.

In a first configuration, referring to FIG. 28 again, the first-type sub-pixel 10 further includes a second driving transistor 28. The second driving transistor 28 includes: the gate g electrically connected to the first gate line Scan1, a first-electrode s electrically connected to the first data line Data1, and a second-electrode d electrically connected to the first electrode 11.

Based on this connection, when the liquid crystal molecules 9 in the second display region 3 are driven to rotate, the first gate line Scan1 transmits an effective level, the second driving transistor 28 is turned on under the effective level, and the voltage signal transmitted on the first data line Data1 is further transmitted to the first electrode 11 via the turned-on second driving transistor 28. The liquid crystal molecules 9 rotate under the electric field formed by the first electrode 11 and the second electrode 12. The voltage transmitted to the first electrode 11 may be a data voltage for image display, or may be a first driving voltage for capturing images.

In this configuration, the second driving transistor 28 is only connected to the first gate line Scan1 and the first data line Data1 already provided in the panel, and there is no need to provide additional gate lines and data lines to drive the second driving transistor 28, which simplifies the panel structure.

Figure 29:
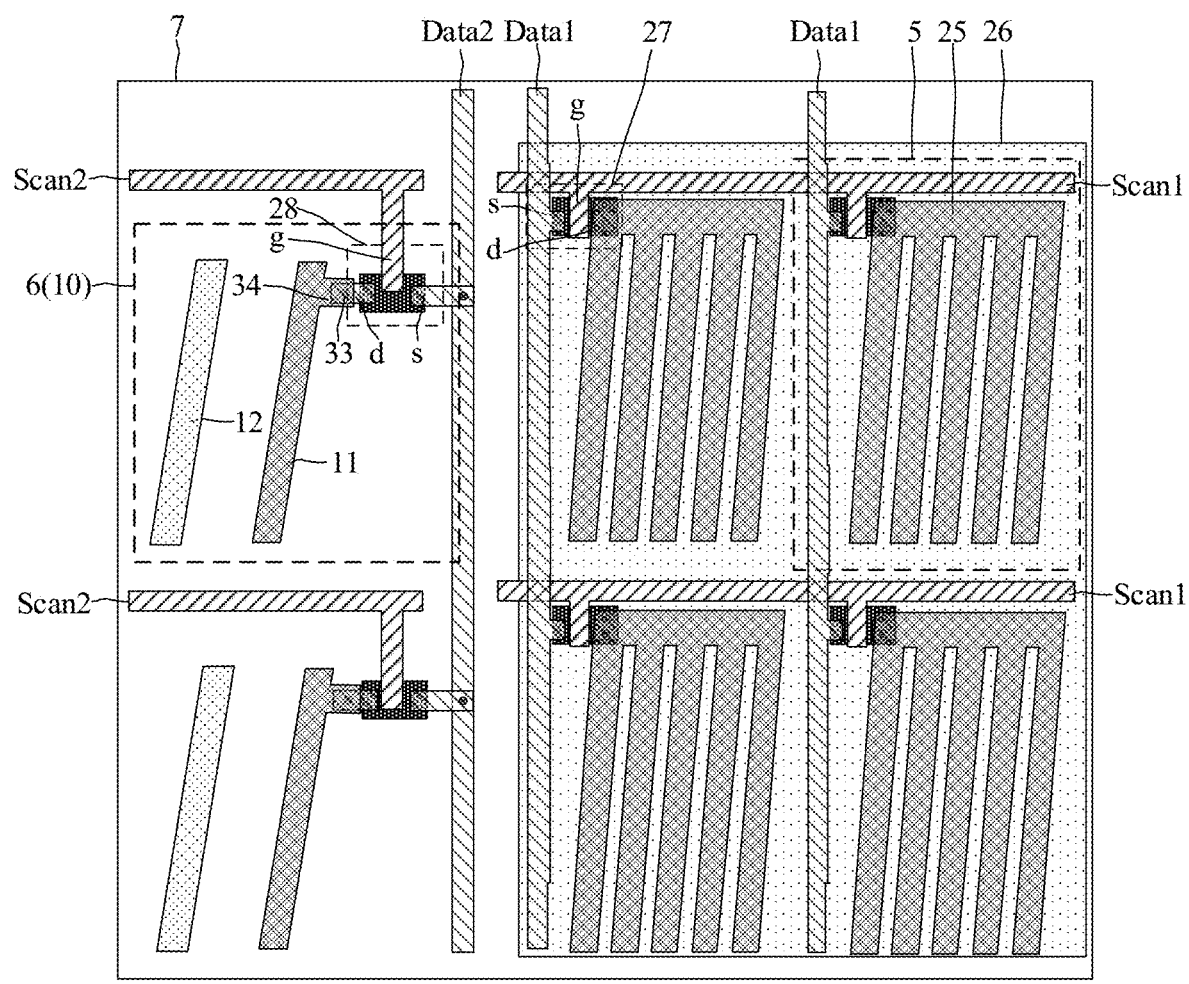
FIG. 29 is a schematic diagram of another connection of a first electrode, according to an embodiment of the present disclosure.

A second configuration is illustrated in FIG. 29, which is a schematic diagram of another connection of a first electrode 11 according to an embodiment of the present disclosure. As shown in FIG. 29, the first-type sub-pixel 10 further includes a second driving transistor 28. The second driving transistor 28 includes the gate g electrically connected to a second gate line Scan2, a first-electrode s electrically connected to a second data line Data2, and a second-electrode d electrically connected to the first electrode 11.

Figure 30:
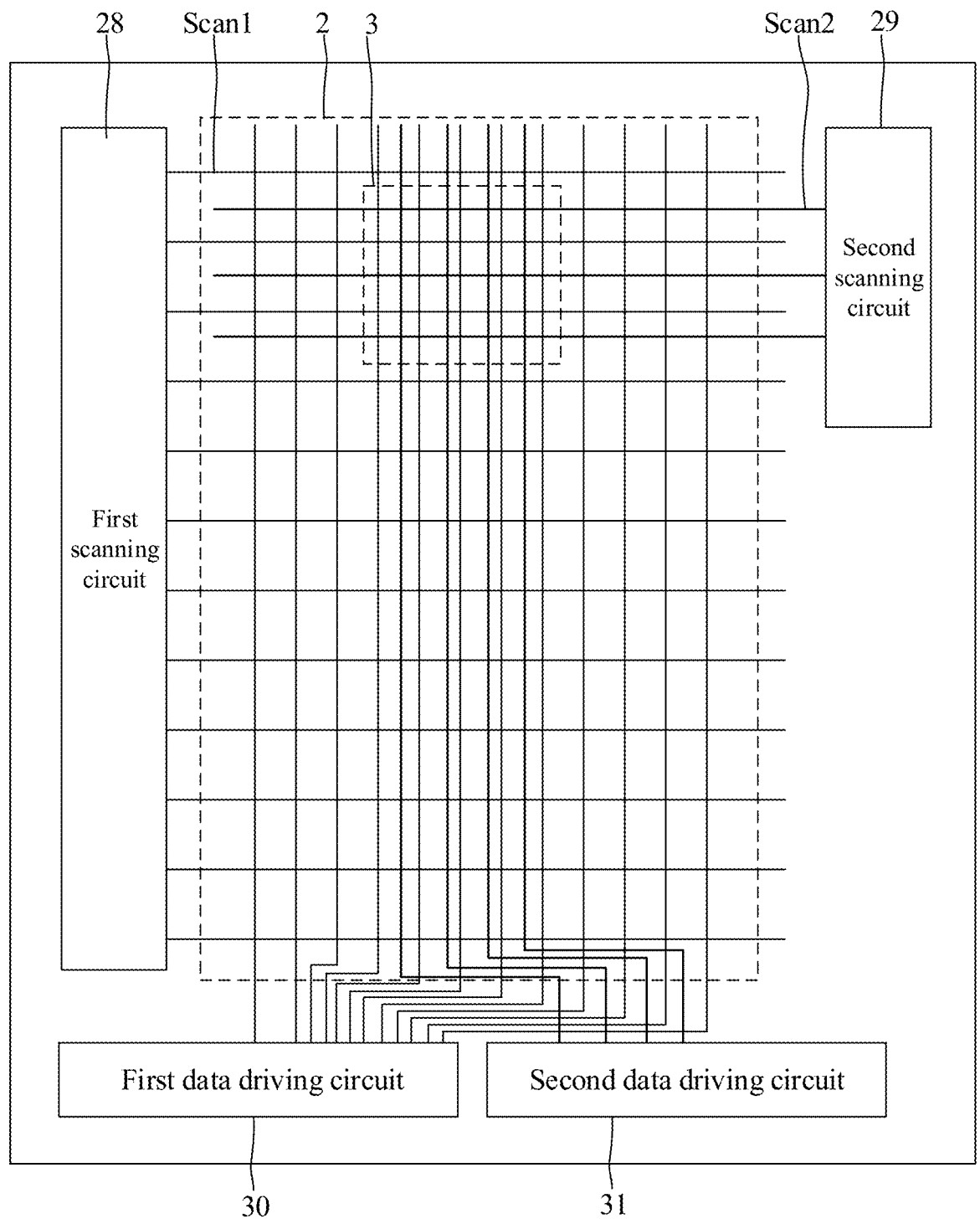
FIG. 30 is a schematic diagram of a connection between a gate line and a data line, according to an embodiment of the present disclosure.

FIG. 30 is a schematic diagram of a connection of a gate line and a data line according to an embodiment of the present disclosure. As shown in FIG. 30, the display panel further includes a first scanning circuit 28 electrically connected to the first gate line Scan1, and a second scanning circuit 29 electrically connected to the second gate line Scan2. In addition, the display panel further includes a first data driving circuit 30 electrically connected the first data line Data1, and a second data driving circuit 31 electrically connected to the second data line Data2.

Based on this connection, the second display region 3 and the first display region 2 are independently controlled. When the liquid crystal molecules 9 in the second display region 3 are driven to rotate, the second gate line Scan2 provides an actual level, the second driving transistor 28 is turned on under the actual level, and the voltage signal transmitted on the second data line Data2 is transmitted to the first electrode 11 through the turned-on second driving transistor 28. The liquid crystal molecules 9 are driven to rotate under the electric field formed by the first electrode 11 and the second electrode 12. The voltage transmitted to the first electrode 11 can be a data voltage for image display, or can be a first driving voltage for capturing images.

If the first electrode 11 and the first pixel electrode 25 share the same data line, this data line not only provides a voltage to the first electrode 11, but also provides a data voltage to the first pixel electrode 25. That is, in a frame period, the first electrode 11 can only receive the voltage once, and thus the frequency at which the first electrode 11 receives the voltage signal is limited. However, with the above configuration, the second driving transistor 28 is driven separately by the second gate line Scan2 and the second data line Data2. The second data line Data2 is only used to transmit signals to the first electrode 11, and does not transmit signals to the first pixel electrode 25. In this case, the moment when the first electrode 11 receives the voltage signal is not restricted by other factors, and the frequency at which the first electrode 11 receives the voltage signal can be flexibly adjusted.

For example, when the images are captured by the second display region 3, the second data line Data2 can be controlled to provide a higher first driving voltage to the first electrode 11 at a lower frequency. In this way, the liquid crystal molecules 9 are controlled to rotate to the greatest extent to increase the transmittance of the second display region 3 and to simultaneously reduce the refreshing frequency, thereby reducing power consumption. In an embodiment, the second data line Data2 can be controlled to alternately supply to the first electrode 11 the data voltage for screen display and the first driving voltage for capturing images at a lower frequency. In this way, power consumption is reduced. In addition, a process of display images and a process of capturing images can be simultaneously performed on the second display region 3, so that the picture displayed on the display panel is a complete image, and the display effect is improved.

In addition, the second display region 3 is driven by the second scanning circuit 29 and the second data driving circuit 31 independently. The first scanning circuit 28 and the first data driving circuit 30 only drive the first display region 2 to display, and the second scanning circuit 29 and the second data driving circuit 31 only drive the second display region 3 to display or capture images. Thus, the circuit designs of the scanning circuit and the data driving circuit are simplified.

Figure 31:
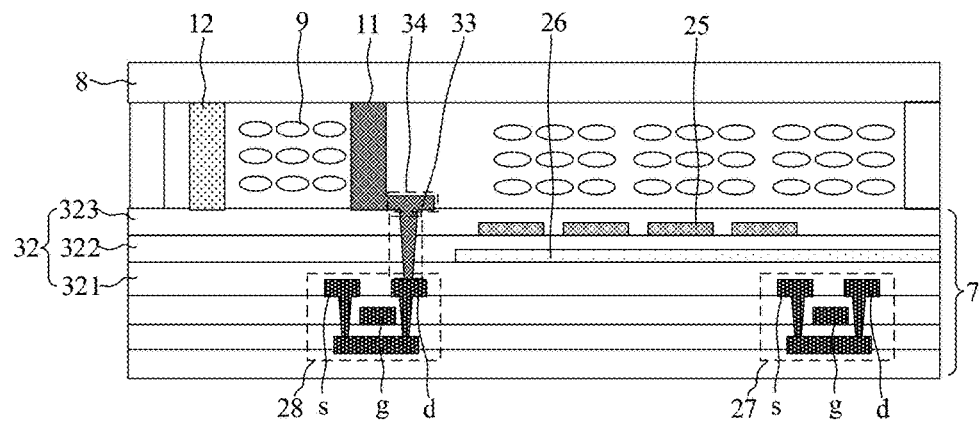
FIG. 31 is a schematic diagram of a layer structure of a first driving transistor and a second driving transistor, according to an embodiment of the present disclosure.

FIG. 31 is a schematic diagram of a layer structure of the first driving transistor 27 and the second driving transistor 28 according to an embodiment of the present disclosure. As shown in FIG. 31, the gate g of the second driving transistor 28 and the gate g of the first driving transistor 27 are arranged in the same layer. The first-electrode s and the second-electrode d of the second driving transistor 28, and the first-electrode s and the second-electrode d of the first driving transistor 27 are arranged in the same layer. In this case, the gate g of the second driving transistor 28 and the gate g of the first driving transistor 27 are formed by the same patterning process. The first-electrode s and the second-electrode d of the second driving transistor 28, and the first-electrode s and the second-electrode d of the first driving transistor 27 are formed by the same patterning process. In this way, the process flows are simplified, and the second driving transistor 28 does not occupy additional layer space, which is more conducive to the thin and light design of the panel.

In an embodiment, in conjunction with FIG. 28 and FIG. 29 and referring to FIG. 31 again, the display panel further includes an insulating layer 32 provided between the second-electrode d of the second driving transistor 28 and the first electrode 11. The insulating layer 32 has a via hole 33. In addition, the display panel further includes a connecting part 34 provided in the same layer as the first electrode 11 and electrically connected to the first electrode 11. The connecting part 34 is further electrically connected to the second-electrode d of the second driving transistor 28 through the via hole 33. By leading the connecting part 34 in the same layer as the second electrode 12 to be electrically connected to the second driving transistor 28, the position of the second driving transistor 28 is flexibly disposed, and the second driving transistor 28 does not need to be limited to be arranged at a position closer to the second electrode 12.

It should be noted that the insulating layer 32 between the second-electrode d of the second driving transistor 28 and the first electrode 11 may include multiple layers. For example, referring to FIG. 31 again, the insulating layer 32 may include a first insulating layer 321 arranged between the first common electrode 26 and the second-electrode d of the second driving transistor 28, a second insulating layer 322 arranged between the first common electrode 26 and the first pixel electrode 25, and a third insulating layer 323 arranged between the first pixel electrode 25 and the first electrode 11.

Figure 32:
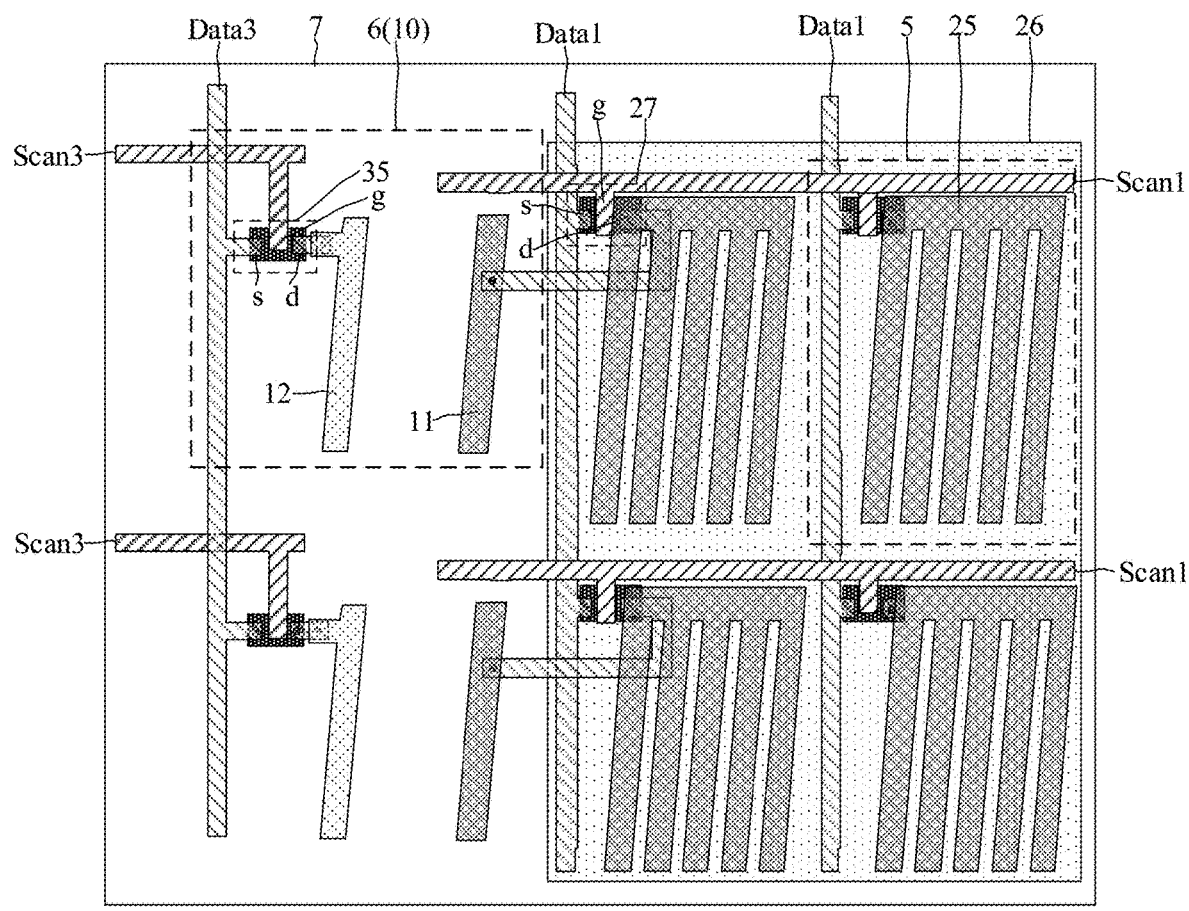
FIG. 32 is a schematic diagram of another connection of a first electrode, according to an embodiment of the present disclosure.

A third configuration is illustrated in FIG. 32, which is a schematic diagram of another connection of a first electrode 11 according to an embodiment of the present disclosure. As shown in FIG. 32, the first electrode 11 is electrically connected to the second-electrode d of the first driving transistor 27. The first-type sub-pixel 10 further includes a third driving transistor 35. The third driving transistor 35 includes: a gate g electrically connected to a third gate line Scan3, a first-electrode s electrically connected to a third data line Data3, and a second-electrode d electrically connected to the second electrode 12.

In this configuration, the first electrode 11 receives the data voltage which is received by the first pixel electrode 25 connected to the first electrode 11. The second electrode 12 is independently driven by the third driving transistor 35. The third data line Data3 is utilized to respectively provide different second driving voltages to the second electrodes 12 of different first-type sub-pixels 10, so that a required voltage difference is formed between the first electrode 11 and the second electrode 12 of each first-type sub-pixel 10.

Based on the above configuration, the first electrodes 11 and the second electrodes 12 of different first-type sub-pixels 10 can be controlled to form different voltage differences therebetween, by providing second driving voltages with different magnitudes to the second electrodes 12 of the different first-type sub-pixels 10. In this way, differentially driving different first-type sub-pixels 10 can be driven differently.

For example, when the different first-type sub-pixels 10 have the different distances between the first electrodes 11 and the second electrodes 12 and have the same voltage difference between the electrodes, the first-type sub-pixel 10, the electrodes of which has a farther distance, will form an electric field with a slightly small intensity. In this case, based on this differential driving, the second electrode 12 of the first-type sub-pixel 10, the electrodes of which has the farther distance, can be provided with a slightly smaller second driving voltage to increase the voltage difference between the electrodes of the first-type sub-pixel 10. Therefore, the electric field intensity formed by the electrodes of the first-type sub-pixel 10 is the same as that formed by the electrodes of other first-type sub-pixel 10, which improves the uniformity of transmission of the second display region 3, and then optimizes the imaging effect.

In an embodiment, in consideration of some influence factors such as process errors, there can be some differences in the degree of light loss caused by the layers at the positions of different first-type sub-pixels 10. When the image is captured by the second display region 3, even if the liquid crystal molecules 9 in the second display region 3 is rotate to a same degree, the quantity of ambient light finally incident to the camera assembly will be different. When the layer at a certain position causes a large loss of ambient light, in consideration of this difference, a slightly small second driving voltage can be provided to the second electrode 12 at this position, and the voltage difference between the first electrode 11 and the second electrode 12 can be increased, which can drive the liquid crystal molecules 9 at this position to rotate to a greater degree, and increase the amount of the ambient light incident through the liquid crystal molecules 9. The incident ambient light can counteract light blocked by the layer, so that the transmittance at this position is consistent with the light transmittances at other positions, and the uniformity of the transmittance in the second display region 3 is improved, thereby optimizing the imaging effect.

Figure 33:
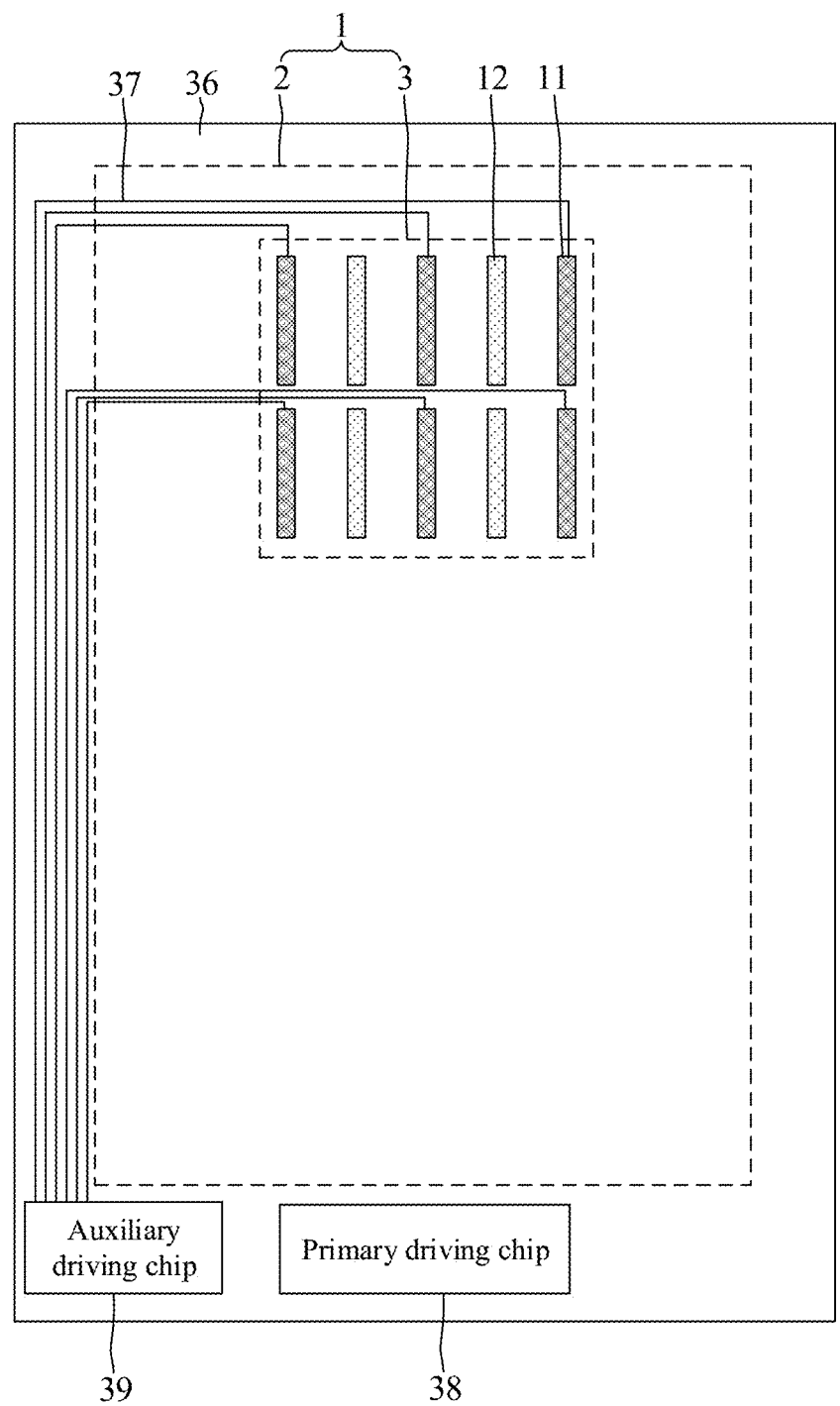
FIG. 33 is a schematic diagram of another connection of a first electrode, according to an embodiment of the present disclosure.

A fourth configuration is illustrated in FIG. 33, which is a schematic diagram of another connection of a first electrode 11 according to an embodiment of the present disclosure. As shown in FIG. 33, the display panel further includes a non-display region 36 surrounding the display region 1. The first electrode 11 is electrically connected to a first driving signal line 37 located in the non-display region 36.

In this configuration, the first electrode 11 is electrically connected to the first driving signal line 37, and the first electrode 11 does not need to share the data line with the first pixel electrode 25. Therefore, the moment when the first electrode 11 receives the voltage signal are not limited to other factors, and the frequency at which the first electrode 11 receives the voltage signal can be flexibly adjusted. For example, when the image is captured by the second display region 3, the first driving signal line 37 may provide a higher first driving voltage to the first electrode 11 at a lower frequency. In this way, the liquid crystal molecules 9 are controlled to rotate to the greatest extent to increase the transmittance of the second display region 3, reduce the refreshing frequency, thereby reducing power consumption. In another embodiment, the first driving signal line 37 can alternately supply to the first electrode 11 the data voltage for image display and the first driving voltage for capturing an image at a lower frequency. In this way, power consumption is reduced. In addition, a process of display images and a process of capturing images can be simultaneously performed on the second display region 3, so that the display panel presents a complete image and improves the imaging effect.

In an embodiment, different first-type sub-pixels 10 can be driven differentially by providing different first driving voltages to the first electrodes 11 thereof. In combination with the above analysis, this differential driving improves the uniformity of transmission of the second display region 3 and optimizes the imaging effect.

In addition, in this configuration, whether a voltage signal is transmitted on the first electrode 11 can be controlled by directly controlling the signal transmitted on the first driving signal line 37. When it is not necessary to drive the liquid crystal molecules 9 in the second display region 3 to rotate, the first driving signal line 37 is directly controlled to not output a signal. When it is necessary to drive the liquid crystal molecules 9 in the second display region 3 to rotate, the first driving signal line 37 is directly controlled to output a voltage signal. Such driving mode is easy to control, and there is no need to provide additional driving transistor, which simplifies the structure of the panel.

In an embodiment, referring to FIG. 33 again, the display panel further includes a primary driving chip 38 and an auxiliary driving chip 39 that are arranged in the non-display region 36. The primary driving chip 38 is electrically connected to the first data line Data1 (not shown in FIG. 33), and configured to provide the data voltage to the first data line Data1. The auxiliary driving chip 39 is electrically connected to the first driving signal line 37, and configured to provide the first driving voltage to the first driving signal line. In this case, the second display region 3 is controlled by an independent driving chip. The primary driving chip 38 and the auxiliary driving chip 39 have independent functions respectively, which reduces the complexity of the circuit structure in the chip and simplifies the chip design. Moreover, combined with the above analysis, the second display region 3 is driven by independent driving chips, which is easy to flexibly adjust the frequency at which the first electrode 11 receives the signal. For example, the power consumption can be reduced by controlling the first electrode 11 to receive the signal at a lower frequency.

Figure 34:
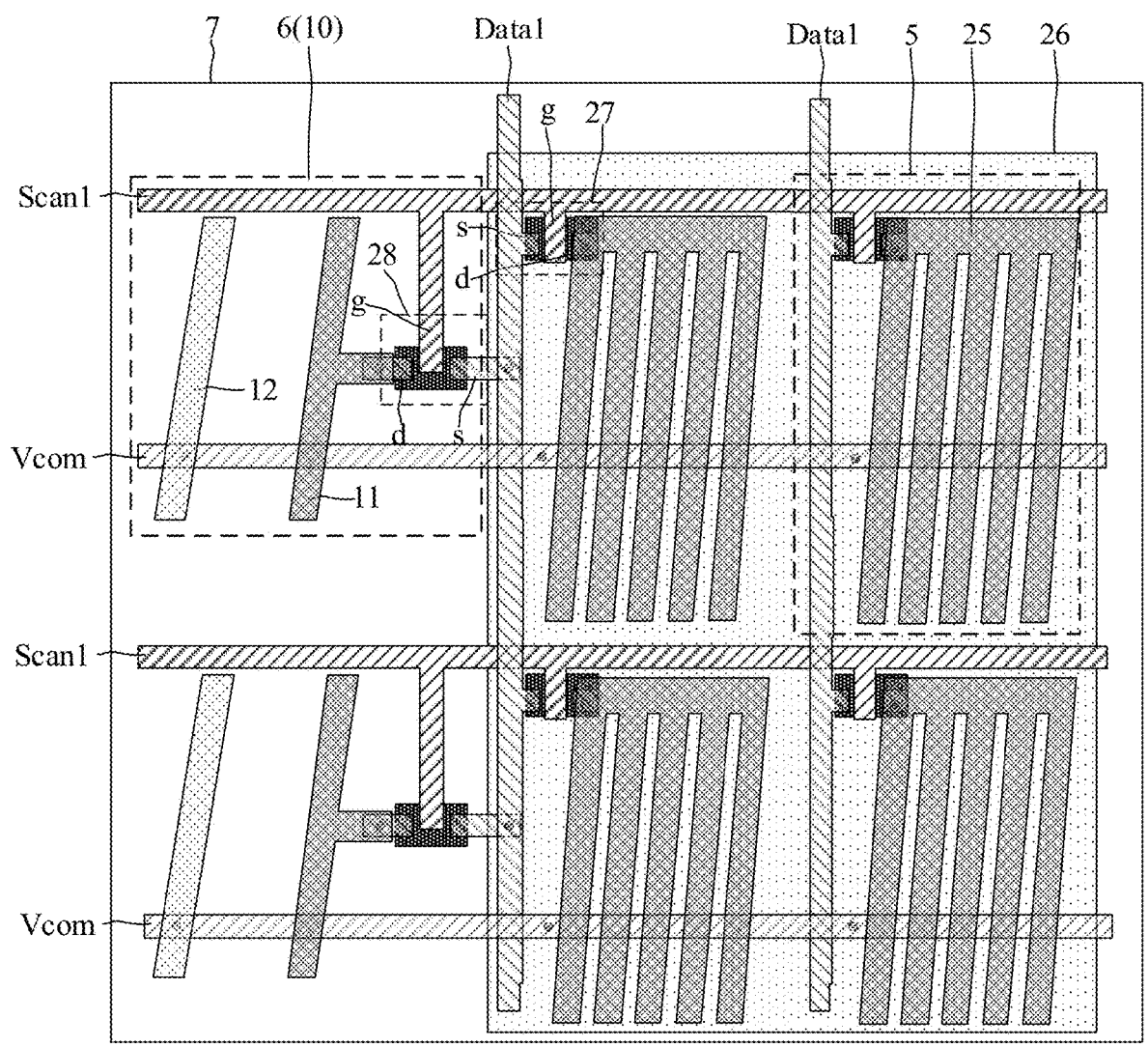
FIG. 34 is a schematic diagram of a connection of a second electrode, according to an embodiment of the present disclosure.

FIG. 34 is a schematic diagram of a connection of a second electrode 12 according to an embodiment of the present disclosure. As shown in FIG. 34, the first sub-pixel 5 includes a first pixel electrode 25 and a first common electrode 26 that are located on the array substrate 7. An orthographic projection of the first pixel electrode 25 on the plane of the display panel overlaps with an orthographic projection of the first common electrode 26 on the plane of the display panel. The first common electrode 26 is electrically connected to a common signal line Vcom, and the second electrode 12 is further electrically connected to the common signal line Vcom.

In this configuration, the second electrodes 12 of the multiple first-type sub-pixels 10 receive the same common voltage as the second driving voltage. The magnitude of the voltage signal received by the first electrode 11 can be used to control a demanded voltage difference formed between the first electrode 11 and the second electrode 12. With this configuration, the second electrode 12 is only electrically connected to the common signal line Vcom already provided in the panel, and there is no need to provide additional driving signal lines or driving transistors, which simplifies the structure of the panel.

Figure 35:
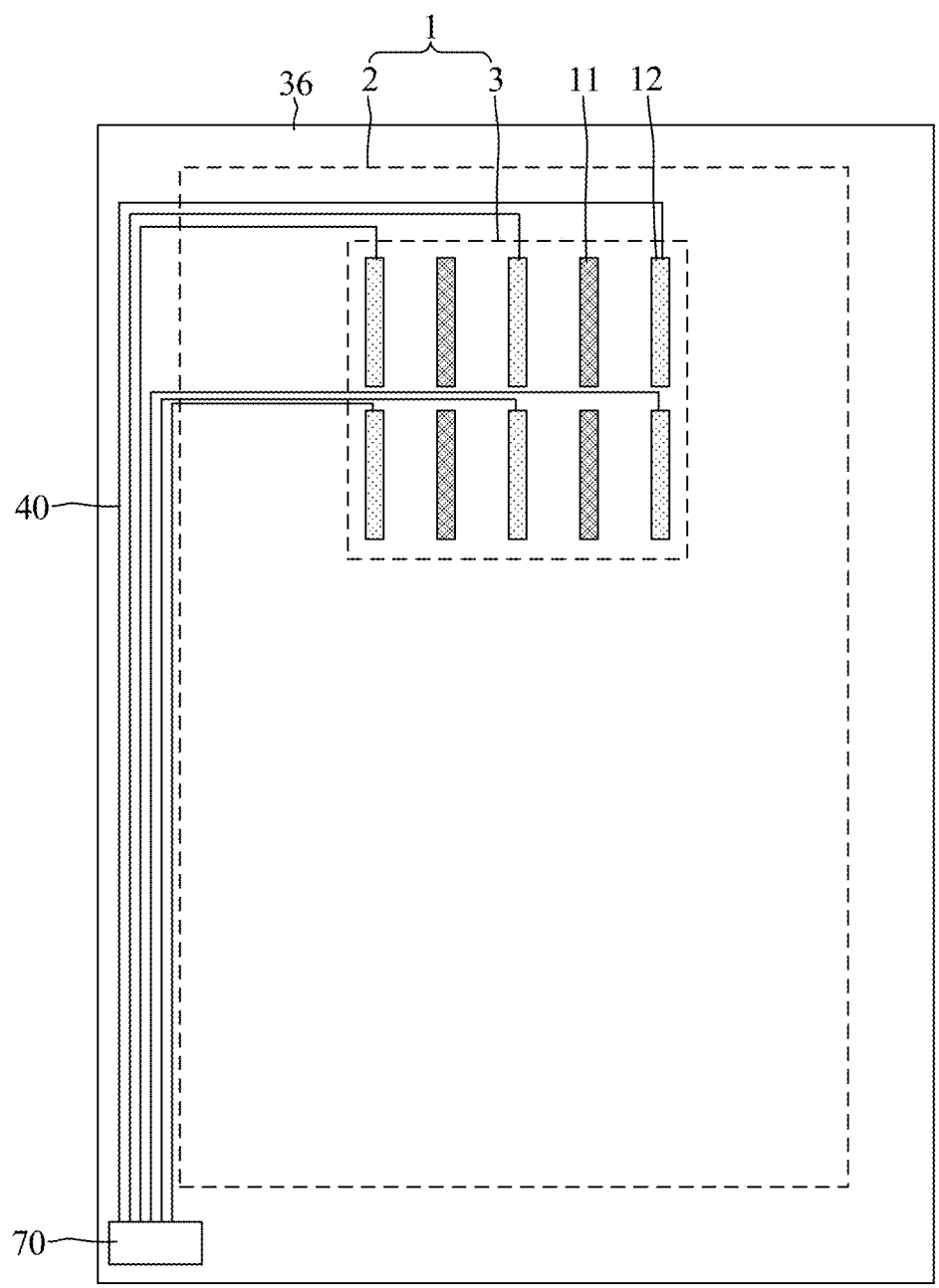
FIG. 35 is a schematic diagram of another connection of a second electrode, according to an embodiment of the present disclosure.

FIG. 35 is another schematic diagram of a connection of a second electrode 12 according to an embodiment of the present disclosure. As shown in FIG. 35, the display panel further includes a non-display region 36 surrounding the display region 1. The second electrode 12 is electrically connected to a second driving signal line 40 located in the non-display region 36. A driving module 70 electrically connected to the second driving signal line 40 is provided in the non-display region 36, and configured to provide a second driving voltage to the second driving signal line 40. The second electrode 12 is driven with more flexibility by arranging the separate second driving signal line 40 to provide signals to the second electrode 12. The second driving signal line 40 can provide a voltage signal different from the common voltage. The second driving voltages received by the second electrodes 12 of the first-type sub-pixels 10 can be the same or different.

It is understandable that when the second electrodes 12 only need to receive the same second driving voltage, the second electrodes 12 of the multiple first-type sub-pixels 10 can be connected to the same second driving signal line 40.

In an embodiment, when the images are displayed on the display panel, the first electrode 11 receives the data voltage, and the second electrode 12 receives the common voltage. When the images are captured by the display panel, the first electrode 11 receives the first driving voltage, and the second electrode 12 receives the second driving voltage.

In this configuration, only the first electrode 11 and the second electrode 12 are provided in the first-type sub-pixel 10, which are used to drive the liquid crystal molecules 9 to rotate when the images are displayed on the display panel, so as to output the light emitted by the backlight module from the panel, and are also used to drive the liquid crystal molecules 9 to rotate when the images are captured by the display panel, so as to make the ambient light enter the camera assembly. No extra pixel electrodes and common electrodes needs to be provided in the first-type sub-pixels 10, which not only simplifies the pixel structure of the first-type sub-pixel 10, but also prevents other pixel electrodes and common electrodes from blocking the opening region 13, thereby increasing the transmittance of the opening region 13.

Figure 36:
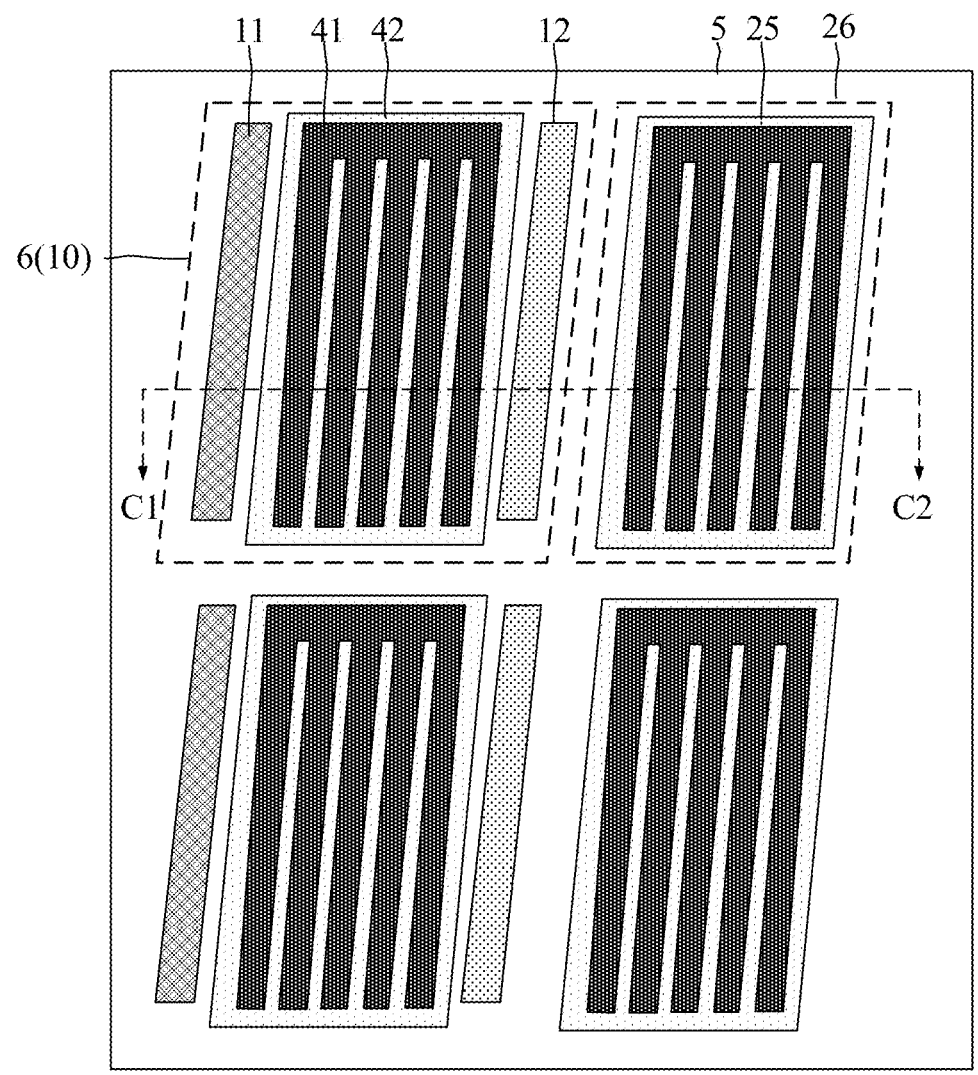
FIG. 36 is a schematic diagram of a structure of a first-type sub-pixel, according to an embodiment of the present disclosure.
Figure 37:
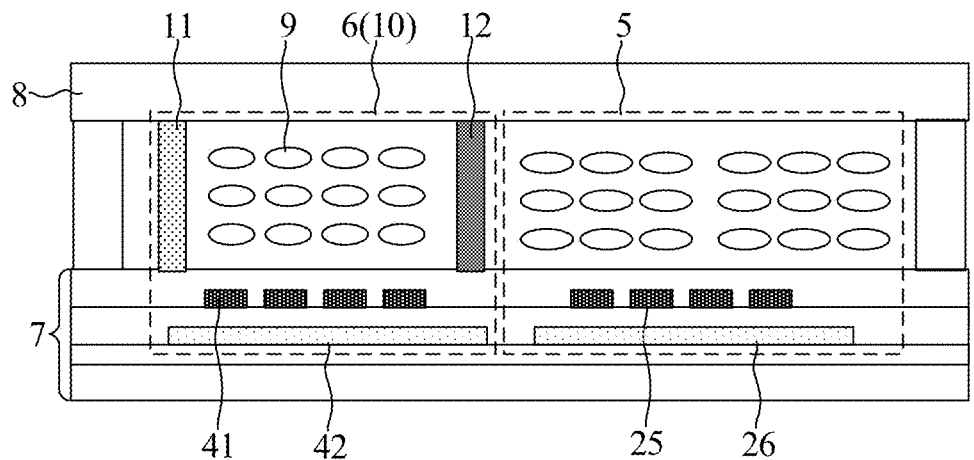
FIG. 37 is a cross-sectional view of FIG. 36 along C1-C2, in accordance with an embodiment of the present disclosure.

FIG. 36 is another schematic diagram of a first-type sub-pixel 10 according to an embodiment of the present disclosure, and FIG. 37 is a cross-sectional view of FIG. 36 along C1-C2. As shown in FIG. 36 and FIG. 37, the first-type sub-pixel 10 further includes a second pixel electrode 41 and a second common electrode 42. An orthographic projection of the second pixel electrode 41 on the plane of the display panel overlaps with an orthographic projection of the second common electrode 42 on the plane of the display panel. When the images are displayed on the display panel, the second pixel electrode 41 receives the data voltage, and the second common electrode 42 receives the common voltage. When the images are captured by the display panel, the first electrode 11 receives the first driving voltage, and the second electrode 12 receives the second driving voltage.

In this configuration, the first-type sub-pixel 10 is provided with two sets of electrodes. The first electrode 11 and the second electrode 12 are only used to drive the liquid crystal molecules 9 to rotate when the images are captured by the display panel, so as to make the ambient light enter the camera assembly. The second pixel electrode 41 and the second common electrode 42 are only used to drive the liquid crystal molecules 9 to rotate when the images are displayed on the display panel, so as to output the light emitted by the backlight module from the panel.

In combination with the electrode structure of the first sub-pixel 5, it can be seen that the structures of the first electrode 11 and the second electrode 12 are quite different from the structures of the first pixel electrode 25 and the first common electrode 26 of the conventional first sub-pixel 5 in the panel. An electric field formed between the conventional first pixel electrode 25 and the conventional first common electrode 26 includes a longitudinal electric field component. However, the electric field formed between the first electrode 11 and the second electrode 12 is a transverse electric field. The transverse electric field has a stronger drive capability for the liquid crystal molecules 9. Under the condition that the two sets of electrodes receive the same voltage, the light-emitting brightness of the first-type sub-pixel 10 will be slightly higher than that of the first sub-pixel 5. Thus, in the above embodiment, by adding the second pixel electrode 41 and the second common electrode 42 in the first-type sub-pixel 10, the second pixel electrode 41 and the second common electrode 42 can be used to realize the display function. In this way, the electrodes used to realize the display function in the first sub-pixel 10 and the first sub-pixel 5 have the same structure and the same drive capabilities for the liquid crystal molecules 9. Thus, the light-emitting brightness of the first sub-pixel 10 and the light-emitting brightness of the conventional first sub-pixel 5 are the same, which optimizes the display performance of the panel.

It should be noted that the second common electrode 42 and the first common electrode 26 can have a block electrode structure as shown in FIG. 36, or can be connected together to form a covering whole layer of the common electrode structure.

Figure 38:
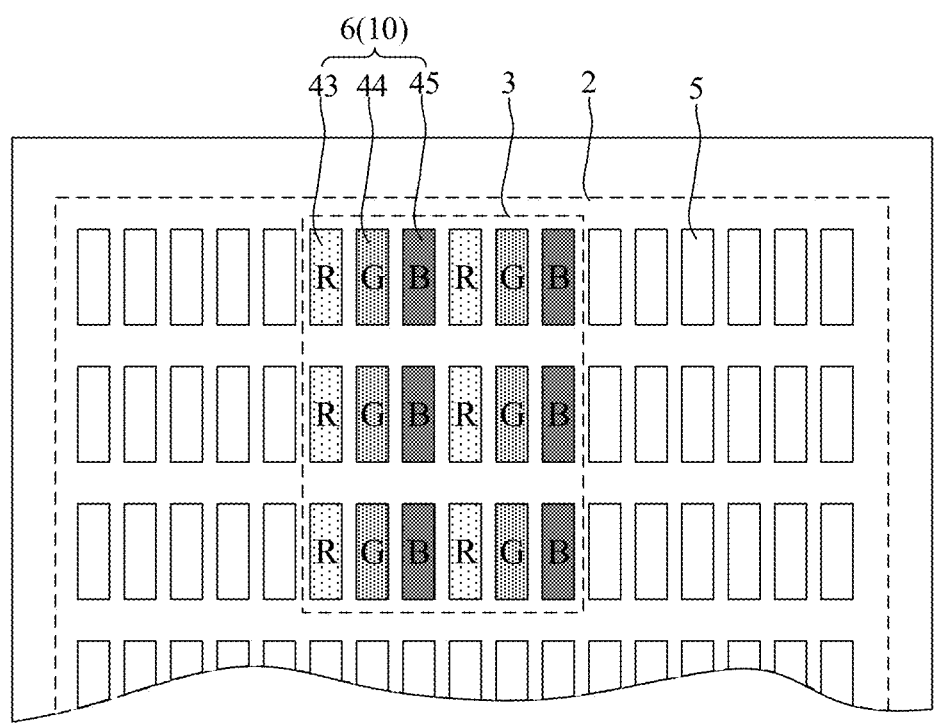
FIG. 38 is a top view of a second display region, according to an embodiment of the present disclosure.

FIG. 38 is a top view of a second display region 3 according to an embodiment of the present disclosure. As shown in FIG. 38, all the second sub-pixels 6 are the first-type sub-pixels 10, which include a red sub-pixel 43, a green sub-pixel 44, and a blue sub-pixel 45.

When the images are displayed on the display panel, the first electrode 11 and the second electrode 12 (or the second pixel electrode 41 and the second common electrode 42) in the first-type sub-pixel 10 drive the liquid crystal molecules 9 to rotate, so as to output light emitted by the backlight module from the panel. When the images are captured by the display panel, the first electrode 11 and the second electrode 12 in the first-type sub-pixel 10 drive the liquid crystal molecules 9 to rotate, so as to make the ambient light enter the imaging component.

In the case that the second sub-pixels 6 are all the first-type sub-pixels 10, when the images are captured by the display panel, all the sub-pixels in the second display region 3 drive the liquid crystal molecules 9 to rotate to a greater extent. Thus, the second display region 3 has a high transmittance, the quantity of ambient light entering the camera assembly through the second display region 3 is increased, and the imaging effect is improved.

In an embodiment, when high transmittance sub-pixels are provided in the second display region 3, the first-type sub-pixels 10 may also include the high transmittance sub-pixels.

Figure 39:
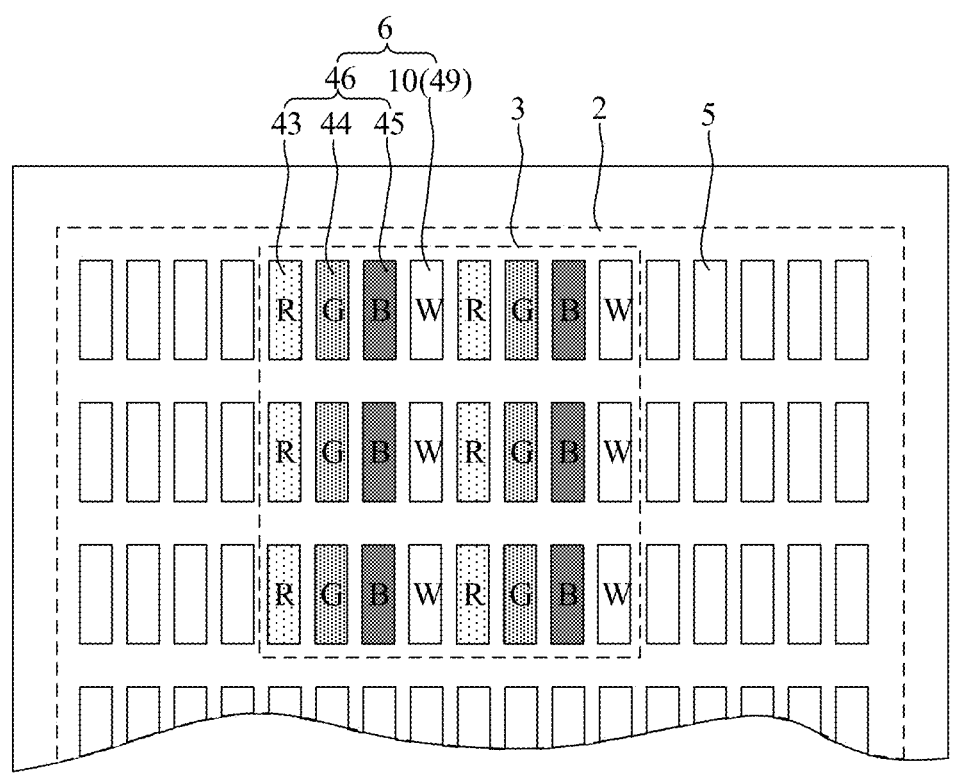
FIG. 39 is another top view of a second display region, according to an embodiment of the present disclosure.
Figure 40:
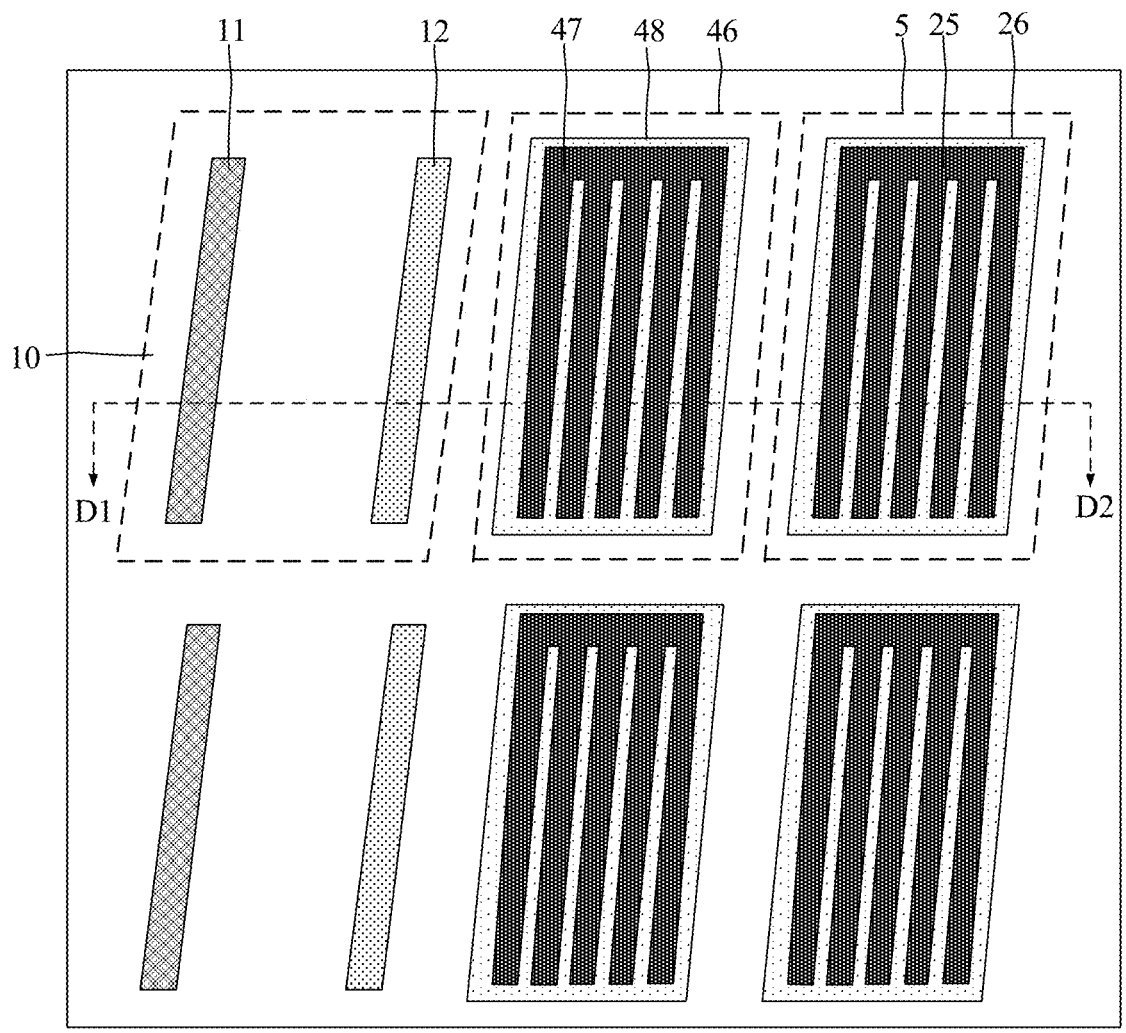
FIG. 40 is a schematic diagram of a structure of a second-type sub-pixel, according to an embodiment of the present disclosure.
Figure 41:
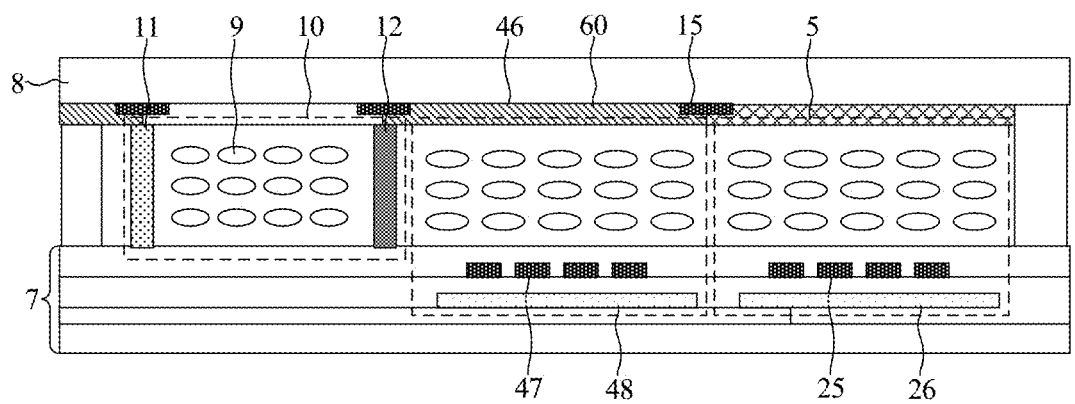
FIG. 41 is a cross-sectional view of FIG. 40 along D1-D2, in accordance with an embodiment of the present disclosure.

FIG. 39 is another top view of a second display region 3 according to an embodiment of the present disclosure, FIG. 40 is a schematic diagram of a second-type sub-pixel 46 according to an embodiment of the present disclosure, and FIG. 41 is a cross-sectional view of FIG. 40 along D1-D2. In another embodiment, as shown in FIG. 39 to FIG. 41, some second sub-pixels 6 are the second-type sub-pixel 46. The second-type sub-pixel 46 includes a third pixel electrode 47 and a third common electrode 48 that are located on the array substrate 7. An orthographic projection of the third pixel electrode 47 on the plane of the display panel overlaps with an orthographic projection of the third common electrode 48 on the plane of the display panel. When the images are displayed on the display panel, the third pixel electrode 47 of the second-type sub-pixel 46 receives the data voltage, and the third common electrode 48 receives the common voltage. When the images are captured by the display panel, the first electrode 11 of the first-type sub-pixel 10 receives the first driving voltage, and the second electrode 12 receives the second driving voltage.

In this configuration, the first-type sub-pixels 10 are only used to realize the camera function, and the second-type sub-pixels 46 are only used to realize the display function. In combination with the above analysis, it can be seen that the first electrode 11 and the second electrode 12 of the first-type sub-pixel 10 are quite different from the first pixel electrode 25 and the first common electrode 26 of a conventional first sub-pixel 5 in the panel. If the first electrode 11 and the second electrode 12 are used for image display, the light-emitting brightness of the first-type sub-pixel 10 will be higher than the light-emitting brightness of the first sub-pixel 5. Therefore, by separately arranging the second-type sub-pixels 46 for display in the second display region 3, the second-type sub-pixels 46 and the first sub-pixels 5 have the same electrode structure for realizing the display function, which thus have the same drive capability for the liquid crystal molecules 9. In this way, the light-emitting brightness of the first-type sub-pixel 10 and the light-emitting brightness of the conventional first sub-pixel 5 are the same.

In an embodiment, referring to FIG. 39 again, the first-type sub-pixels 10 include high transmittance sub-pixels 49, such as white sub-pixels. The second-type sub-pixels 46 include color sub-pixels, such as red sub-pixels 43, green sub-pixels 44, and blue sub-pixels 45.

Please refer to FIG. 41 again. When the first-type sub-pixels 10 include high transmittance sub-pixels 49, a white color resist 60 or no color resist is provided at a position where the color filter substrate 8 and the first-type sub-pixel 10 overlap. When the ambient light passes through the high transmittance sub-pixel 49, the color resist 60 has a small filtering effect on the ambient light, thereby causing a small light loss. Therefore, the high transmittance sub-pixel 49, which is used as an imaging sub-pixel to realize the camera function, can increase the transmittance of ambient light.

Figure 42:
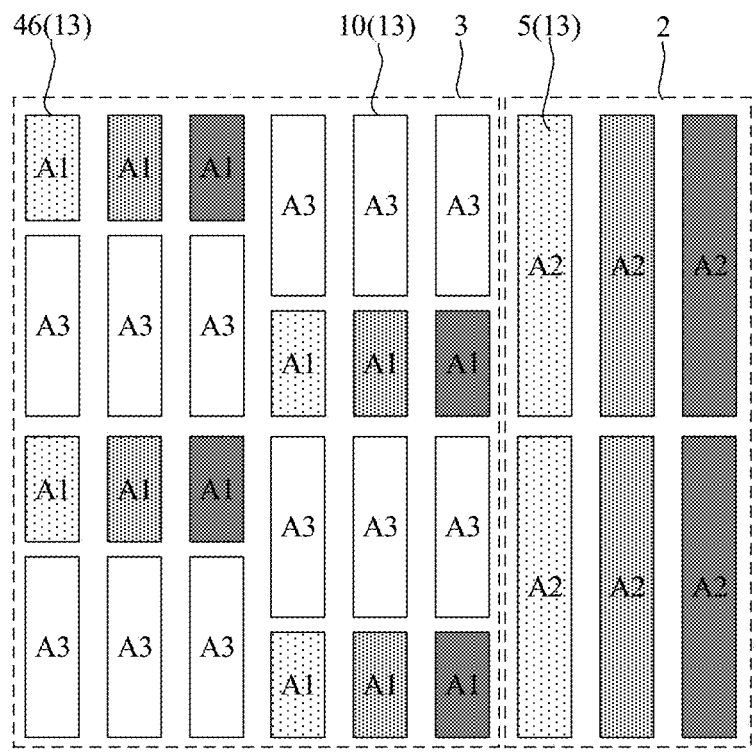
FIG. 42 is a comparison diagram of opening regions of a first sub-pixel and a second-type sub-pixel, according to an embodiment of the present disclosure.

FIG. 42 is a schematic diagram of a comparison of an opening region 13 of a first sub-pixel 5 and an opening region 13 of a second-type sub-pixel 46 according to an embodiment of the present disclosure. In an embodiment, as shown in FIG. 42, the sub-pixel includes an opening region 13. For the second-type sub-pixel 46 and the first sub-pixel 5 that emit light with the same color, an area of the opening region 13 of the second-type sub-pixel 46 is A1, and an area of the opening region 13 of the first sub-pixel 5 is A2, where $$2 \le \frac{A2}{A1} \le 3.$$

By setting the second-type sub-pixel 46 with a smaller opening region 13, sufficient space can be reserved in the second display region 3 for the first-type sub-pixel 10, i.e., the high transmittance sub-pixel 49. In this way, when the images are captured by the display panel, a larger quantity of the ambient light passes through the first-type sub-pixel 10 and then enters the camera assembly.

In an embodiment, referring to FIG. 42 again, the sub-pixel includes an opening region 13. An area of the opening region 13 of the second-type sub-pixel 46 is A1, and an area of the opening region 13 of the first-type sub-pixel 10 is A3. In order to further increase the transmittance of the second display region 3, A1 and A3 satisfy:

$$1 \le \frac{A3}{A1} \le 3.$$

Figure 43:
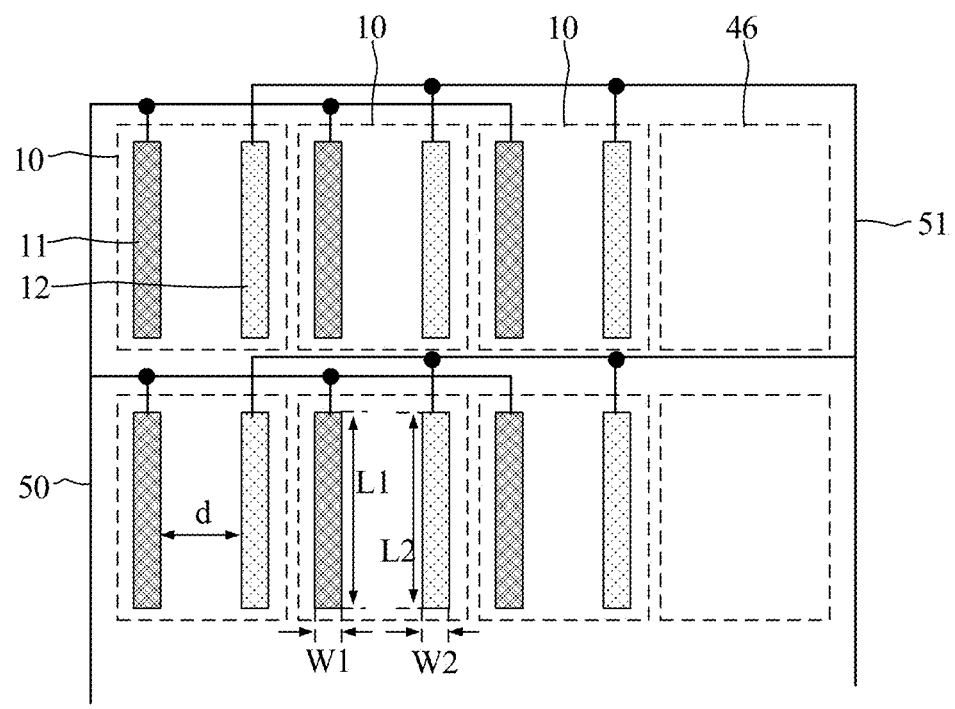
FIG. 43 is a schematic diagram of a connection between a first electrode and a second electrode, according to an embodiment of the present disclosure.

In an embodiment, the second sub-pixel 6 includes the first-type sub-pixel 10 and the second-type sub-pixel 46. Since the first-type sub-pixels 10 do not need to implement a display function, the first electrodes 11 of the first-type sub-pixels 10 can receive the same first driving voltage, and the second electrodes 12 of the first-type sub-pixels 10 can receive the same second driving voltage. Based on the above, as shown in FIG. 43, FIG. 43 is a schematic diagram of a connection of a first electrode 11 and a second electrode 12 according to an embodiment of the present disclosure. The first electrodes 11 of multiple first-type sub-pixels 10 are electrically connected to a first signal line 50, and the second electrodes 12 of multiple first-type sub-pixels 10 are electrically connected to a second signal line 51. When the images are captured by the display panel, the first signal line 50 provides the first driving voltage, such as a white state voltage corresponding to the 255th grayscale, to the first electrodes 11 of the multiple first-type sub-pixels 10; and a second signal line 51 provide second driving voltages to the second electrodes 12 of the first-type sub-pixels 10. In this way, the liquid crystal molecules 9 are driven to rotate under the electric field formed by the first electrode 11 and the second electrode 12.

With this configuration, all the first electrodes 11 are only electrically connected to one first signal line 50, all the second electrodes 12 are only electrically connected to one second signal line 51. No extra driving transistor needs to be provided for the first electrode 11 and the second electrode 12. The driving method is relatively simple. Moreover, the first signal line 50 and the second signal line 51 will not occupy a large space in the non-display region 36, which facilitates the narrow bezel design of the panel.

In an embodiment, when the images are captured by the display panel, a driving process of the first-type sub-pixels 10 includes multiple driving cycles. To avoid polarization of the liquid crystal, for adjacent driving cycles, the first signal line 50 provides a high level and the second signal line 51 provides a low level in one driving cycle; and the first signal line 50 provides a low level, and the second signal line 51 provides a high level in the other driving cycle.

In an embodiment, a duration of one driving cycle is T. In order to control the signals on the first signal line 50 and the second signal line 51 to switch at an appropriate rate, T may satisfy:

$$1 \text{ Hz} \le \frac{1}{T} \le 120 \text{ Hz}.$$

In an embodiment, the voltage difference between a voltage received by the first electrode 11 and a voltage received by the second electrode 12 is $\Delta V$, where $\Delta V$ may satisfy: $\Delta V \le 40V$, so as to avoid that the voltage difference is greater than a maximum voltage difference that the liquid crystal molecules 9 can be carried when the liquid crystal molecules 9 rotate to a maximum extent.

In an embodiment, it is possible to set an appropriate minimum value for $\Delta V$ according to the distance between the first electrode 11 and the second electrode 12. For example, when the first electrode 11 and the second electrode 12 are respectively located at both sides of the opening region 13 and are located in the non-opening region 14, the distance between the electrodes is relatively large. In order to ensure that the electric field formed by the electrodes has a sufficient drive capability for the liquid crystal molecules 9, $\Delta V$ may satisfy: $\Delta V \ge 8V$.

In an embodiment, referring to FIG. 43 again, in one first-type sub-pixel 10, a minimum distance between the orthographic projection of the first electrode 11 on the plane of the display panel and the orthographic projection of the second electrode 12 on the plane of the display panel is d, and d may satisfy: $d \le 30$ μm, so as to avoid that the distance between the electrodes is too far away and ensure that the electric field formed by the electrodes has a sufficient drive capability for the liquid crystal molecules 9.

In an embodiment, in order to ensure an enough distance between the first electrode 11 and the second electrode 12 to ensure that the sufficient number of liquid crystal molecules 9 rotate under the transverse electric field, d can satisfy: $d \ge 5$ μm.

In addition, the inventor found that when the first electrodes 11 and the second electrodes 12 correspond to different voltage differences and have different distances, the transmittances are different. According to Table 1, when $\Delta V=14.5V$ and $d=10$ μm, and when $\Delta V=33.5V$ and $d=25$ μm, the transmittance is higher and more ambient light will enter the camera assembly. Therefore, by setting an appropriate voltage difference and a distance between the first electrode 11 and the second electrode 12, the transmittance of the second display region 3 can be increased to a great extent, and the imaging quality can be optimized.

TABLE 1

| ΔV (V) | d (μm) | transmittance |
|---|---|---|
| 8 | 5 | 5.103% |
| 14.5 | 10 | 5.326% |
| 21 | 15 | 5.213% |
| 27 | 20 | 5.062% |
| 33.5 | 25 | 5.348% |
| 40 | 30 | 5.236% |

In addition, it should also be noted that if the first-type sub-pixel 10 includes the first electrode 11 and the second electrode 12, and also includes the second pixel electrode 41 and the second common electrode 42, the second pixel electrode 41 and the second common electrode 42 will inevitably form some interference electric fields with the first electrode 11 and the second electrode 12 when the images are captured by the display panel. Therefore, compared with the structure of the first-type sub-pixel 10 only having the first electrode 11 and the second electrode 12, the voltage difference between the first electrode 11 and the second electrode 12 in the above structure can be appropriately set larger, so as to compensate the interference electric field.

In an embodiment, referring to FIG. 43 again, a width of the first electrode 11 in a direction perpendicular to its extension direction is W1, and a width of the second electrode 12 in a direction perpendicular to its extension direction is W2. In consideration that the electrodes need to have sufficient drive capability, the electrodes should not be too thin. In consideration of the influence of the electrode on the transmittance of the opening region 13, the electrodes should not be too thick. Thus, W1 and W2 may satisfy: 2 μm≤W1≤5 μm, and 2 μm≤W2≤5 μm.

In an embodiment, a length of the first electrode 11 in its extension direction is L1, and a length of the second electrode 12 in its extension direction is L2. In order to match the design size of the conventional sub-pixels, L1 and L2 may satisfy: 50 μm≤L1≤85 μm, and 50 μm≤L2≤85 μm.

Figure 44:
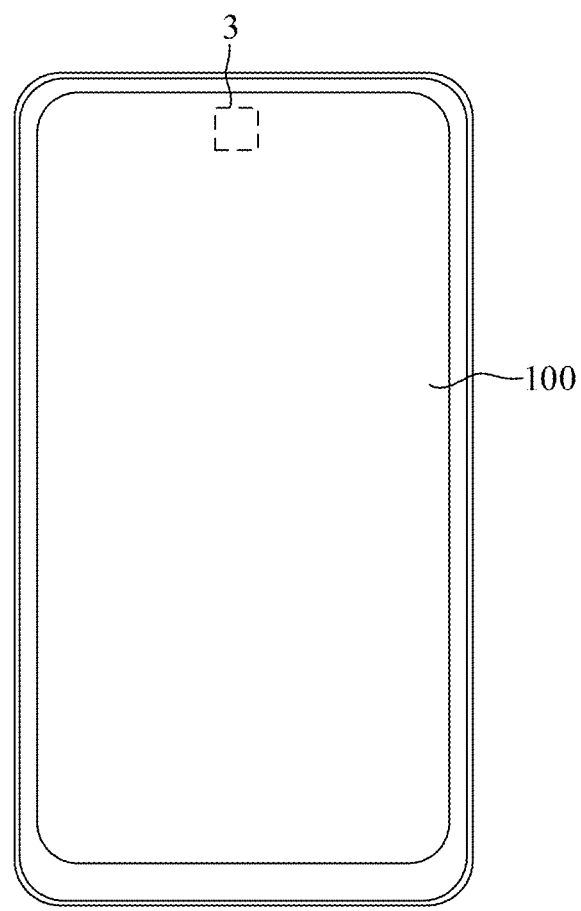
FIG. 44 is a schematic diagram of a display device, according to an embodiment of the present disclosure.

A display device is provided according to an embodiment of the present disclosure. FIG. 44 is a schematic diagram of a display device according to an embodiment of the present disclosure. As shown in FIG. 44, the display device includes the display panel 100. The specific structure of the display panel 100 has been described in detail in the above-mentioned embodiments, and will not be repeated herein. The display device shown in FIG. 44 is merely illustrative, and the display device can be any electronic device with a display function, such as a mobile phone, a tablet computer, a notebook computer, an electronic paper book, or a television.

The above are merely some embodiments of the present disclosure, and are not intended to limit the present disclosure. Any modifications, equivalent substitutions or improvements made within the spirit and principles of the present disclosure shall be included in the protection scope of the present disclosure.

It should be noted that the above embodiments are only used to illustrate, but not to limit the technical solutions of the present disclosure. Although the present application is described in detail with reference to the foregoing embodiments, those skilled in the art shall understand that they can modify the technical solutions described in the foregoing embodiments, or equivalently replace some or all of the technical features. The modifications or replacements shall not direct the essence of the corresponding technical solutions away from the scope of the technical solutions of the embodiments of the present disclosure.

What is claimed is:

1. A display panel, the display panel having a display region, and the display region comprising a first display region and a second display region;
   wherein the display panel comprises:
   a plurality of sub-pixels arranged in the display region, wherein the plurality of sub-pixels comprises first sub-pixels located in the first display region and second sub-pixels located in the second display region;
   an array substrate;
   a color filter substrate opposite to the array substrate; and
   liquid crystal molecules located between the array substrate and the color filter substrate,
   wherein in the second display region, at least one second sub-pixel of the second sub-pixels is at least one first-type sub-pixel, wherein each of the at least one first-type sub-pixel comprises at least one first electrode and at least one second electrode; in one of a first direction and a second direction, an orthographic projection of one of the at least one first electrode and an orthographic projection of one of the at least one second electrode at least partially overlap, and in another of the first direction and the second direction, the orthographic projection of the one of the at least one first electrode and the orthographic projection of the one of the at least one second electrode do not overlap with each other and are separated with each other with a distance greater than zero, wherein the first direction intersects the second direction, and the first direction and the second direction are parallel to a plane of the display panel;
   an extension direction of a projection of one of the at least one first electrode on the plane of the display panel and an extension direction of a projection of one of the at least one second electrode on the plane of the display panel are parallel to each other and form an angle θ with the one of the first direction and the second direction, wherein 0°<θ<90°;
   the at least one first electrode comprises only one first electrode and the at least one second electrode comprises only one second electrode; or the at least one first electrode comprises at least two first electrodes and the at least one second electrode comprises at least two second electrodes, projections of the at least two first electrodes on the plane of the display panel being disconnected from each other, and projections of the at least two second electrodes on the plane of the display panel being disconnected from each other;
   each sub-pixel of the plurality of sub-pixels defines an opening region and a non-opening region surrounding the opening region, the color filter substrate comprises a light shielding layer, and an orthographic projection of the light shielding layer on the plane of the display panel covers the non-opening region; and
   the at least one first electrode and the at least one second electrode are both located on a surface of the color filter substrate facing towards the array substrate, and an orthographic projection of one of the at least one first electrode on the plane of the display panel and an orthographic projection of one of the at least one second electrode on the plane of the display panel overlap with the orthographic projection of the light shielding layer on the plane of the display panel.

2. The display panel of claim 1, wherein the at least one first electrode comprises only one first electrode and the at least one second electrode comprises only one second electrode; wherein each sub-pixel of the plurality of sub-pixels defines an opening region and a non-opening region surrounding the opening region, and the only one first electrode and the only one second electrode are respectively located in the non-opening region and located at two opposite sides of the opening region in the first direction.

3. The display panel of claim 2, wherein the at least one first-type sub-pixel comprises a plurality of first-type sub-pixels; and
   in the first direction, the first electrodes and the second electrodes of the plurality of first-type sub-pixels are arranged alternately; and adjacent first-type sub-pixels of the plurality of first-type sub-pixels in the first direction share one second electrode of the second electrodes or share one first electrode of the first electrodes.

4. The display panel of claim 2, wherein an extension direction of the one of the at least one first electrode and an extension direction of the one of the at least one second electrode are parallel to each other and each form the angle θ with the first direction.

5. The display panel of claim 1, wherein the at least one first electrode comprises at least two first electrodes and the at least one second electrode comprises at least two second electrodes; wherein each sub-pixel of the plurality of sub-pixels defines an opening region and a non-opening region surrounding the opening region; the at least two first electrodes and the at least two second electrodes of one first-type sub-pixel of the at least one first-type sub-pixel are arranged along the first direction; and at least one of an orthographic projection of one first electrode of the at least two first electrodes on the plane of the display panel or an orthographic projection of one second electrode of the at least two second electrodes on the plane of the display panel overlaps with the opening region, and the first electrode or the second electrode that overlaps with the opening region is made of a transparent conductive material.

6. The display panel of claim 1, wherein a height of one of the at least one first electrode in a direction perpendicular to the display panel is H1, a height of one of the at least one second electrode in the direction perpendicular to the display panel is H2, and a distance between the array substrate and the color filter substrate is H, wherein $0.3\ \mu m \leq H1 \leq H$, and $0.3\ \mu m \leq H2 \leq H$.

7. The display panel of claim 1, wherein one of the at least one first electrode comprises a first protrusion part and a first conductive layer covering the first protrusion part, and
the second electrode comprises a second protrusion part and a second conductive layer covering the second protrusion part.

8. The display panel of claim 7, wherein the first protrusion part and the second protrusion part are made of a conductive material.

9. The display panel of claim 7, further comprising:
an auxiliary adhesion layer is provided between the first protrusion part and the first conductive layer, and between the second protrusion part and the second conductive layer.

10. The display panel of claim 1, wherein each of the first sub-pixels comprises:
a first pixel electrode and a first common electrode that are located on the array substrate, wherein an orthographic projection of the first pixel electrode on the plane of the display panel overlaps with an orthographic projection of the first common electrode on the plane of the display panel; and
a first driving transistor comprising a gate electrically connected to a first gate line, a first-electrode electrically connected to a first data line, and a second-electrode electrically connected to the first pixel electrode.

11. The display panel of claim 10, wherein one of the at least one first-type sub-pixel further comprises a second driving transistor comprising a gate electrically connected to the first gate line, a first-electrode electrically connected to the first data line, and a second-electrode electrically connected to one of the at least one first electrode.

12. The display panel of claim 11, wherein the gate of the second driving transistor and the gate of the first driving transistor are arranged in a same layer; and the first-electrode and the second-electrode of the second driving transistor, and the first-electrode and the second-electrode of the first driving transistor are arranged in a same layer.

13. The display panel of claim 11, wherein an insulating layer is provided between the second-electrode of the second driving transistor and one of the at least one first electrode, and the insulating layer is provided with a via hole; and
the display panel further comprises:
a connecting part provided in a same layer as the at least one first electrode and electrically connected to the at least one first electrode, wherein the connecting part is further electrically connected to the second-electrode of the second driving transistor through the via hole.

14. The display panel of claim 10, wherein one of the at least one first-type sub-pixel further comprises a second driving transistor comprising a gate electrically connected to a second gate line, a first-electrode electrically connected to a second data line, and a second-electrode electrically connected to one of the at least one first electrode, and
the display panel further comprises:
a first scanning circuit electrically connected to the first gate line;
a second scanning circuit electrically connected to the second gate line;
a first data driving circuit electrically connected to the first data line; and
a second data driving circuit electrically connected to the second data line.

15. The display panel of claim 10, wherein one of the at least one first electrode is electrically connected to the second-electrode of the first driving transistor; and
one of the at least one first-type sub-pixel further comprises a third driving transistor comprising a gate electrically connected to a third gate line, a first-electrode electrically connected to a third data line, and a second-electrode electrically connected to the second electrode.

16. The display panel of claim 1, wherein the display panel further comprises a non-display region surrounding the display region, and one of the at least one first electrode is electrically connected to a first driving signal line located in the non-display region.

17. The display panel of claim 16, further comprising:
a primary driving chip; and
an auxiliary driving chip electrically connected to the first driving signal line, wherein the primary driving chip and the auxiliary driving chip are located in the non-display region.

18. The display panel of claim 1, wherein each of the first sub-pixels comprises a first pixel electrode and a first common electrode that are located on the array substrate, wherein an orthographic projection of the first pixel electrode on the plane of the display panel overlaps with an orthographic projection of the first common electrode on the plane of the display panel, the first common electrode is electrically connected to a common signal line, and the second electrode is electrically connected to the common signal line.

19. The display panel of claim 1, wherein the display panel further comprises a non-display region surrounding the display region, and the second electrode is electrically connected to a second driving signal line located in the non-display region.

20. The display panel of claim 1, wherein when an image is displayed on the display panel, one of the at least one first electrode receives a data voltage, and one of the at least one second electrode receives a common voltage; and when an image is captured by the display panel, one of the at least one first electrode receives a first driving voltage, and one of the at least one second electrode receives a second driving voltage.

21. The display panel of claim 20, wherein one of the at least one first-type sub-pixel comprises a red sub-pixel, a green sub-pixel, and a blue sub-pixel.

22. The display panel of claim 1, wherein one of the at least one first-type sub-pixel further comprises a second pixel electrode and a second common electrode, and an orthographic projection of the second pixel electrode on the plane of the display panel overlaps with an orthographic projection of the second common electrode on the plane of the display panel;

when an image is displayed on the display panel, the second pixel electrode receives a data voltage, and the second common electrode receives a common voltage; and when an image is captured by the display panel, one of the at least one first electrode receives a first driving voltage, and one of the at least one second electrode receives a second driving voltage.

23. The display panel of claim 1, wherein at least one of the second sub-pixels is a second-type sub-pixel, the second-type sub-pixel comprises a third pixel electrode and a third common electrode that are located on the array substrate, and an orthographic projection of the third pixel electrode on the plane of the display panel overlaps with an orthographic projection of the third common electrode on the plane of the display panel;

when an image is displayed on the display panel, the third pixel electrode of the second-type sub-pixel receives a data voltage, and the third common electrode of the second-type sub-pixel receives a common voltage; and when an image is captured by the display panel, one of the at least one first electrode of one of the at least one first-type sub-pixel receives a first driving voltage, and one of the at least one second electrode of one of the at least one first-type sub-pixel receives a second driving voltage.

24. The display panel of claim 23, wherein one of the at least one first-type sub-pixel comprises a high transmittance sub-pixel; and the second-type sub-pixel comprises a red sub-pixel, a green sub-pixel, and a blue sub-pixel.

25. The display panel of claim 23, wherein each sub-pixel of the plurality of sub-pixels comprises an opening region; for the second-type sub-pixel and one of the first sub-pixels that emit light with a same color, an area of the opening region of the second-type sub-pixel is A1, and an area of the opening region of the first sub-pixel is A2, wherein $$2 \le \frac{A2}{A1} \le 3.$$

26. The display panel of claim 23, wherein each sub-pixel of the plurality of sub-pixels comprises an opening region, an area of the opening region of the second-type sub-pixel is A1, an area of the opening region of one of the at least one first-type sub-pixel is A3, wherein $$1 \le \frac{A3}{A1} \le 3.$$

27. The display panel of claim 23, wherein the at least one first-type sub-pixel comprises a plurality of first-type sub-pixels, and the first electrodes of the plurality of first-type sub-pixels are electrically connected to a first signal line, and the second electrodes of the plurality of first-type sub-pixels are electrically connected to a second signal line.

28. The display panel of claim 27, wherein when an image is captured by the display panel, a driving process of each of the plurality of first-type sub-pixels comprises a plurality of driving cycles; and for adjacent driving cycles, the first signal line provides a high level and the second signal line provides a low level in one of the adjacent driving cycles, and the first signal line provides a low level and the second signal line provides a high level in another one of the adjacent driving cycles.

29. The display panel of claim 28, wherein a duration of a driving cycle of the plurality of driving cycles is T, wherein $$1 \text{ Hz} \le \frac{1}{T} \le 120 \text{ Hz}.$$

30. The display panel of claim 1, wherein a difference between a voltage received by one of the at least one first electrode and a voltage received by one of the at least one second electrode is ΔV, wherein ΔV≤40V.

31. The display panel of claim 1, wherein in one of the at least one first-type sub-pixel, a minimum distance between an orthographic projection of one of the at least one first electrode on the plane of the display panel and an orthographic projection of one of the at least one second electrode on the plane of the display panel is d, wherein d≤30 μm.

32. The display panel of claim 1, wherein a width of one of the at least one first electrode in a direction perpendicular to an extension direction of the first electrode is W1, and a length of the first electrode in the extension direction of the first electrode is L1, wherein 2 μm≤W1≤5 μm, and 50 μm≤L1≤85 μm; and a width of the second electrode in a direction perpendicular to an extension direction of the second electrode is W2, and a length of second electrode in the extension direction of the second electrode is L2, wherein 2 μm≤W2≤5 μm, and 50 μm≤L2≤85 μm.

33. A display panel, the display panel having a display region, and the display region comprising a first display region and a second display region;

wherein the display panel comprises:
a plurality of sub-pixels arranged in the display region, wherein the plurality of sub-pixels comprises first sub-pixels located in the first display region and second sub-pixels located in the second display region;
an array substrate;
a color filter substrate opposite to the array substrate; and
liquid crystal molecules located between the array substrate and the color filter substrate,
wherein in the second display region, at least one second sub-pixel of the second sub-pixels is at least one first-type sub-pixel, wherein each of the at least one first-type sub-pixel comprises at least one first electrode and at least one second electrode; in one of a first direction and a second direction, an orthographic projection of one of the at least one first electrode and an orthographic projection of one of the at least one second electrode at least partially overlap, and in another of the first direction and the second direction, the orthographic projection of the one of the at least one first electrode and the orthographic projection of the one of the at least one second electrode do not overlap with each other and are separated with each other with a distance greater than zero, wherein the first direction intersects the second direction, and the first direction and the second direction are parallel to a plane of the display panel;

an extension direction of a projection of one of the at least one first electrode on the plane of the display panel and an extension direction of a projection of one of the at least one second electrode on the plane of the display panel are parallel to each other and form an angle θ with the one of the first direction and the second direction, wherein 0°<θ<90°;

the at least one first electrode comprises only one first electrode and the at least one second electrode comprises only one second electrode; or the at least one first electrode comprises at least two first electrodes and the at least one second electrode comprises at least two second electrodes, projections of the at least two first electrodes on the plane of the display panel being disconnected from each other, and projections of the at least two second electrodes on the plane of the display panel being disconnected from each other;

wherein one of the at least one first electrode comprises a first sub-electrode and a second sub-electrode, the first sub-electrode is located on a surface of the color filter substrate facing towards the array substrate, and the second sub-electrode is located on a surface of the array substrate facing towards the color filter substrate, and an orthographic projection of the first sub-electrode on the plane of the display panel overlaps with an orthographic projection of the second sub-electrode on the plane of the display panel; and one of the at least one second electrode comprises a third sub-electrode and a fourth sub-electrode, the third sub-electrode is located on the surface of the color filter substrate facing towards the array substrate, and the fourth sub-substrate is located on the surface of the array substrate facing towards the color filter substrate, and an orthographic projection of the third sub-electrode on the plane of the display panel overlaps with an orthographic projection of the fourth sub-electrode on the plane of the display panel.

34. The display panel of claim 33, wherein a height of the first sub-electrode in a direction perpendicular to the display panel is equal to a height of the second sub-electrode in the direction perpendicular to the display panel; and a height of the third sub-electrode in the direction perpendicular to the display panel is equal to a height of the fourth sub-electrode in the direction perpendicular to the display panel.

35. The display panel of claim 34, wherein the height of the first sub-electrode in the direction perpendicular to the display panel is equal to the height of the third sub-electrode in the direction perpendicular to the display panel.

36. A display device, comprising a display panel, the display panel having a display region, and the display region comprising a first display region and a second display region;

wherein the display panel comprises:
a plurality of sub-pixels arranged in the display region, wherein the plurality of sub-pixels comprise first sub-pixels located in the first display region and second sub-pixels located in the second display region;
an array substrate;
a color filter substrate opposite to the array substrate; and
liquid crystal molecules located between the array substrate and the color filter substrate,
wherein in the second display region, at least one second sub-pixel of the second sub-pixels is at least one first-type sub-pixel, wherein each of the at least one first-type sub-pixel comprises at least one first electrode and at least one second electrode; in one of a first direction and a second direction, an orthographic projection of one of the at least one first electrode and an orthographic projection of one of the at least one second electrode at least partially overlap, and in another of the first direction and the second direction, the orthographic projection of the one of the at least one first electrode and the orthographic projection of the one of the at least one second electrode do not overlap with each other and are separated with each other with a distance greater than zero, wherein the first direction intersects the second direction, and the first direction and the second direction are parallel to a plane of the display panel;

an extension direction of a projection of one of the at least one first electrode on the plane of the display panel and an extension direction of a projection of one of the at least one second electrode on the plane of the display panel are parallel to each other and form an angle θ with the one of the first direction and the second direction, wherein 0°<θ<90°;

each of the at least one first electrode comprises only one first electrode and each of the at least one second electrode comprises only one second electrode; or each of the at least one first electrode comprises a plurality of first electrodes and each of the at least one second electrode comprises a plurality of second electrodes, projections of the plurality of first electrodes on the plane of the display panel being disconnected from each other, and projections of the plurality of second electrodes on the plane of the display panel being disconnected from each other;

each sub-pixel of the plurality of sub-pixels defines an opening region and a non-opening region surrounding the opening region, the color filter substrate comprises a light shielding layer, and an orthographic projection of the light shielding layer on the plane of the display panel covers the non-opening region; and the at least one first electrode and the at least one second electrode are both located on a surface of the color filter substrate facing towards the array substrate, and an orthographic projection of one of the at least one first electrode on the plane of the display panel and an orthographic projection of one of the at least one second electrode on the plane of the display panel overlap with the orthographic projection of the light shielding layer on the plane of the display panel.

* * * * *